(12) United States Patent
Yeung et al.

(10) Patent No.: US 10,255,220 B2
(45) Date of Patent: Apr. 9, 2019

(54) DYNAMIC TERMINATION SCHEME FOR MEMORY COMMUNICATION

(71) Applicant: Rambus Inc., Sunnyvale, CA (US)

(72) Inventors: Chi-Ming Yeung, Cupertino, CA (US); David Secker, San Jose, CA (US); Ravindranath Kollipara, Palo Alto, CA (US); Shajith Musaliar Sirajudeen, Bangalore (IN); Yoshie Nakabayashi, Tokyo (JP)

(73) Assignee: Rambus Inc., Sunnyvale, CA (US)

( * ) Notice: Subject to any disclaimer, the term of this patent is extended or adjusted under 35 U.S.C. 154(b) by 303 days.

(21) Appl. No.: 15/051,554

(22) Filed: Feb. 23, 2016

(65) Prior Publication Data
US 2016/0291894 A1 Oct. 6, 2016

Related U.S. Application Data

(60) Provisional application No. 62/140,290, filed on Mar. 30, 2015, provisional application No. 62/187,166, filed on Jun. 30, 2015.

(51) Int. Cl.
  *G06F 13/00* (2006.01)
  *G06F 13/40* (2006.01)
(52) U.S. Cl.
  CPC ................... *G06F 13/4068* (2013.01)
(58) Field of Classification Search
  None
  See application file for complete search history.

(56) References Cited

U.S. PATENT DOCUMENTS

| | | |
|---|---|---|
| 6,308,232 B1 | 10/2001 | Gasbarro |
| 6,480,409 B2 | 11/2002 | Park et al. |
| 6,502,161 B1 | 12/2002 | Perego et al. |
| 7,342,411 B2 | 3/2008 | Vergis et al. |
| 7,486,104 B2 | 2/2009 | Oh et al. |
| 7,915,912 B2 | 3/2011 | Oh et al. |
| 8,274,308 B2 | 9/2012 | McCall et al. |
| 8,588,012 B2 | 11/2013 | Wilson et al. |
| 8,599,631 B2 | 12/2013 | Shaeffer et al. |
| 2007/0247185 A1 | 10/2007 | Oie et al. |
| 2008/0077732 A1 | 3/2008 | Risse |
| 2014/0002131 A1 | 1/2014 | Shaeffer |
| 2014/0347092 A1 | 11/2014 | Amirkhany et al. |

FOREIGN PATENT DOCUMENTS

WO  WO-2012/033664 A2  3/2012

OTHER PUBLICATIONS

JEDEC Standard, "Low Power Double Data Rate 4 (LDDR4)", JESD209-4, Aug. 2014. JEDEC Solid State Technology Association. 196 pages.
Open NAND Flash Interface, "Open NAND Flash Interface Specification" Revision 3.0, Mar. 9, 2011. 288 pages.

*Primary Examiner* — Midys Rojas
(74) *Attorney, Agent, or Firm* — Lowenstein Sandler LLP

(57) ABSTRACT

System and method for dynamic termination control to enable use of an increased number of memory modules on a single channel. In some embodiments, six or eight DIMMs are coupled to a single channel. The dynamic termination scheme can include configurations for input bus termination (IBT) on each of the memory modules for the address bus/command bus and configurations for on-die termination (ODT) one each of the memory modules for the data bus.

18 Claims, 18 Drawing Sheets

300

| Write to / Read from | IBT @ DIMM1 | IBT @ DIMM2 | IBT @ DIMM3 | IBT @ DIMM4 | IBT @ DIMM5 | IBT @ DIMM6 |
|---|---|---|---|---|---|---|
| DIMM1 | OFF | 100Ω | 100Ω | 100Ω | 100Ω | 100Ω |
| DIMM2 | 100Ω | OFF | 100Ω | 100Ω | 100Ω | 100Ω |
| DIMM3 | 100Ω | 100Ω | OFF | 100Ω | 100Ω | 100Ω |
| DIMM4 | 100Ω | 100Ω | 100Ω | OFF | 100Ω | 100Ω |
| DIMM5 | 100Ω | 100Ω | 100Ω | 100Ω | OFF | 100Ω |
| DIMM6 | 100Ω | 100Ω | 100Ω | 100Ω | 100Ω | OFF |

| Write to / Read from | IBT @ DIMM1 | IBT @ DIMM2 | IBT @ DIMM3 | IBT @ DIMM4 | IBT @ DIMM5 | IBT @ DIMM6 |
|---|---|---|---|---|---|---|
| DIMM1 | OFF | 100Ω | 100Ω | 100Ω | 100Ω | 100Ω |
| DIMM2 | 100Ω | OFF | 100Ω | 100Ω | 100Ω | 100Ω |
| DIMM3 | 100Ω | 100Ω | OFF | 100Ω | 100Ω | 100Ω |
| DIMM4 | 100Ω | 100Ω | 100Ω | OFF | 100Ω | 100Ω |
| DIMM5 | 100Ω | 100Ω | 100Ω | 100Ω | OFF | 100Ω |
| DIMM6 | 100Ω | 100Ω | 100Ω | 100Ω | 100Ω | OFF |

FIGURE 3B

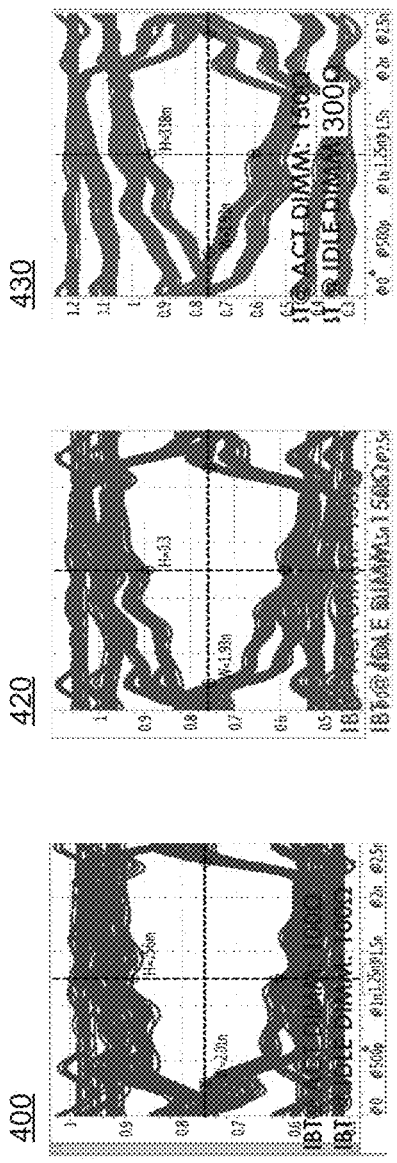
FIG 4C
FIG 4B
FIG 4A
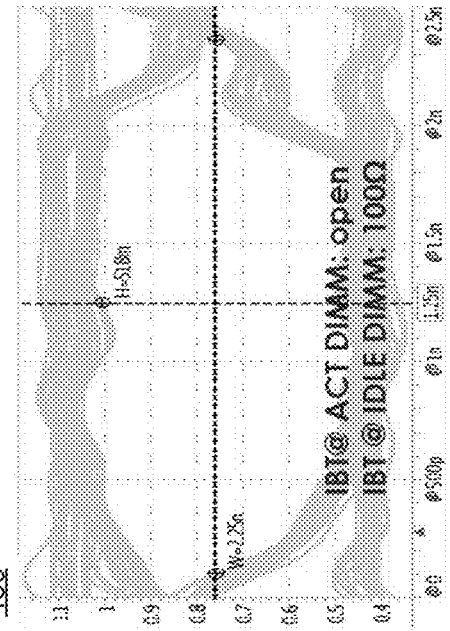
FIG 4E
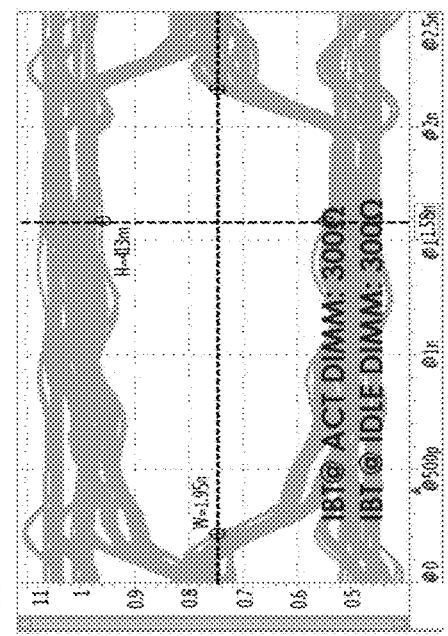
FIG 4D

FIGURE 5

| READ/WRITE | ODT @ CPHY | ODT @ DIMM0 | ODT @ DIMM2 | ODT @ DIMM4 | ODT @ DIMM1 | ODT @ DIMM3 | ODT @ DIMM5 |
|---|---|---|---|---|---|---|---|
| WRITE to DIMM0 | OFF | 120 ohm | 60 ohm | 60 ohm | 60 ohm | 60 ohm | 60 ohm |
| WRITE to DIMM2 | OFF | 60 ohm | 120 ohm | 60 ohm | 60 ohm | 60 ohm | 60 ohm |
| WRITE to DIMM4 | OFF | 60 ohm | 60 ohm | 120 ohm | 60 ohm | 60 ohm | 60 ohm |
| WRITE to DIMM1 | OFF | 60 ohm | 60 ohm | 60 ohm | 120 ohm | 60 ohm | 60 ohm |
| WRITE to DIMM3 | OFF | 60 ohm | 60 ohm | 60 ohm | 60 ohm | 120 ohm | 60 ohm |
| WRITE to DIMM5 | OFF | 60 ohm | 60 ohm | 60 ohm | 60 ohm | 60 ohm | 120 ohm |
| READ from DIMM0 | 120 ohm | OFF | 60 ohm | 60 ohm | 60 ohm | 60 ohm | 60 ohm |
| READ from DIMM2 | 120 ohm | 60 ohm | OFF | 60 ohm | 60 ohm | 60 ohm | 60 ohm |
| READ from DIMM4 | 120 ohm | 60 ohm | 60 ohm | OFF | 60 ohm | 60 ohm | 60 ohm |
| READ from DIMM1 | 120 ohm | 60 ohm | 60 ohm | 60 ohm | OFF | 60 ohm | 60 ohm |
| READ from DIMM3 | 120 ohm | 60 ohm | 60 ohm | 60 ohm | 60 ohm | OFF | 60 ohm |
| READ from DIMM5 | 120 ohm | 60 ohm | 60 ohm | 60 ohm | 60 ohm | 60 ohm | OFF |

FIGURE 6

| READ/WRITE | ODT @ CPHY | ODT @ DIMM0 | ODT @ DIMM1 |
|---|---|---|---|
| WRITE to DIMM0 | OFF | 60 ohm (R1) & ODT off (R2) | 120 ohm (R1) & ODT off (R2) |
| WRITE to DIMM1 | OFF | 120 ohm (R1) & ODT off (R2) | 60 ohm (R1) & ODT off (R2) |
| READ from DIMM0 | 120 ohm | OFF | 60 ohm (R1) & ODT off (R2) |
| READ from DIMM1 | 120 ohm | 60 ohm (R1) & ODT off (R2) | OFF |

| WRITE to / READ from | IBT @ P_RC0 | IBT @ DIMM0 | IBT @ DIMM1 | IBT @ DIMM2 | IBT @ DIMM3 | IBT @ DIMM4 | IBT @ DIMM5 | IBT @ DIMM6 | IBT @ DIMM7 |
|---|---|---|---|---|---|---|---|---|---|
| DIMM0 | OFF | OFF | RTT | RTT | RTT | OFF | OFF | OFF | OFF |
| DIMM1 | | RTT | OFF | RTT | RTT | OFF | OFF | OFF | OFF |
| DIMM2 | | RTT | RTT | OFF | RTT | OFF | OFF | OFF | OFF |
| DIMM3 | | RTT | RTT | RTT | OFF | OFF | OFF | OFF | OFF |
| DIMM4 | | OFF | OFF | OFF | OFF | RTT | RTT | RTT | RTT |
| DIMM5 | | OFF | OFF | OFF | OFF | RTT | RTT | OFF | RTT |
| DIMM6 | | OFF | OFF | OFF | OFF | RTT | OFF | RTT | RTT |
| DIMM7 | | OFF | OFF | OFF | OFF | RTT | RTT | RTT | OFF |

1400

FIGURE 14

DYNAMIC TERMINATION SCHEME FOR MEMORY COMMUNICATION

CROSS REFERENCE TO RELATED APPLICATIONS

This application claims the benefit of and priority to the provisional patent application, U.S. Ser. No. 62/140,290, entitled "DYNAMIC TERMINATION SCHEME FOR MEMORY MODULES," with filing date Mar. 30, 2015, which is herein incorporated by reference in its entirety.

This application claims the benefit of and priority to the provisional patent application, U.S. Ser. No. 62/187,166, entitled "DYNAMIC TERMINATION SCHEME FOR MEMORY MODULES," with filing date Jun. 30, 2015, which is herein incorporated by reference in its entirety.

The application is related to U.S. Ser. No. 62/173,134, entitled "MEMORY SYSTEM DESIGN USING BUFFER (S) ON A MOTHERBOARD," with filing date Jun. 9, 2015, which is herein incorporated by reference in its entirety.

BACKGROUND

Increasingly, information is stored and processed in large data storage systems. At a base level, these data storage systems are configured with large amounts of memory to support the processing of large amounts of data. However, the current system designs can limit the amount of memory that is used by these systems.

BRIEF DESCRIPTION OF THE DRAWINGS

Further aspects of the present disclosure will become apparent from the following description which is given by way of example only and with reference to the accompanying drawings in which:

FIGS. 3A-B show exemplary dynamic termination configurations for an address/command bus, in accordance with various embodiments.

FIGS. 4A, 4B, 4C, 4D, and 4E show exemplary simulation results of various termination configurations, in accordance with various embodiments.

FIG. 5 shows exemplary dynamic termination configurations for a data bus with registered or buffered dual in-line memory modules (RDIMMs), in accordance with various embodiments.

FIG. 6 shows exemplary dynamic termination configurations for a data bus with load reduced dual in-line memory modules (LRDIMMs), in accordance with various embodiments.

FIG. 7 shows exemplary dynamic termination configurations for a data bus during the bringing up of a system, in accordance with various embodiments.

FIG. 11 shows exemplary dynamic termination configurations for a data bus with registered or buffered dual in-line memory modules (RDIMMs), in accordance with various embodiments.

FIG. 12 shows exemplary dynamic termination configurations for a data bus with load reduced dual in-line memory modules (LRDIMMs), in accordance with various embodiments.

FIG. 14 shows exemplary dynamic termination configurations for an address/command bus, in accordance with various embodiments.

DETAILED DESCRIPTION

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments support dynamic termination control for improved performance with a plurality of memory modules on a single channel. In some embodiments, six dual in-line memory modules (DIMMs) are coupled to a single channel. The dynamic termination reduces signal reflection thereby allowing increased memory density on a single channel. Embodiments include modified logic to change the input bus termination (MT) and on-die termination (ODT) termination configurations dynamically. Embodiments can be used with any type of memory module (e.g., DDR3 DIMMs, DDR4 DIMMs, DDR5 DIMMs, Non-Volatile Memory (NVM) modules, Storage Class Memory (SCM) Modules, etc.).

The FIGS. illustrate example components used by various embodiments. Although specific components are disclosed in the FIGS., it should be appreciated that such components are exemplary. That is, embodiments are well suited to having various other components or variations of the components recited in the FIGS. It is appreciated that the components in FIGS. may operate with other components than those presented, and that not all of the components of FIGS. are required to achieve the goals of embodiments.

Figure 1:
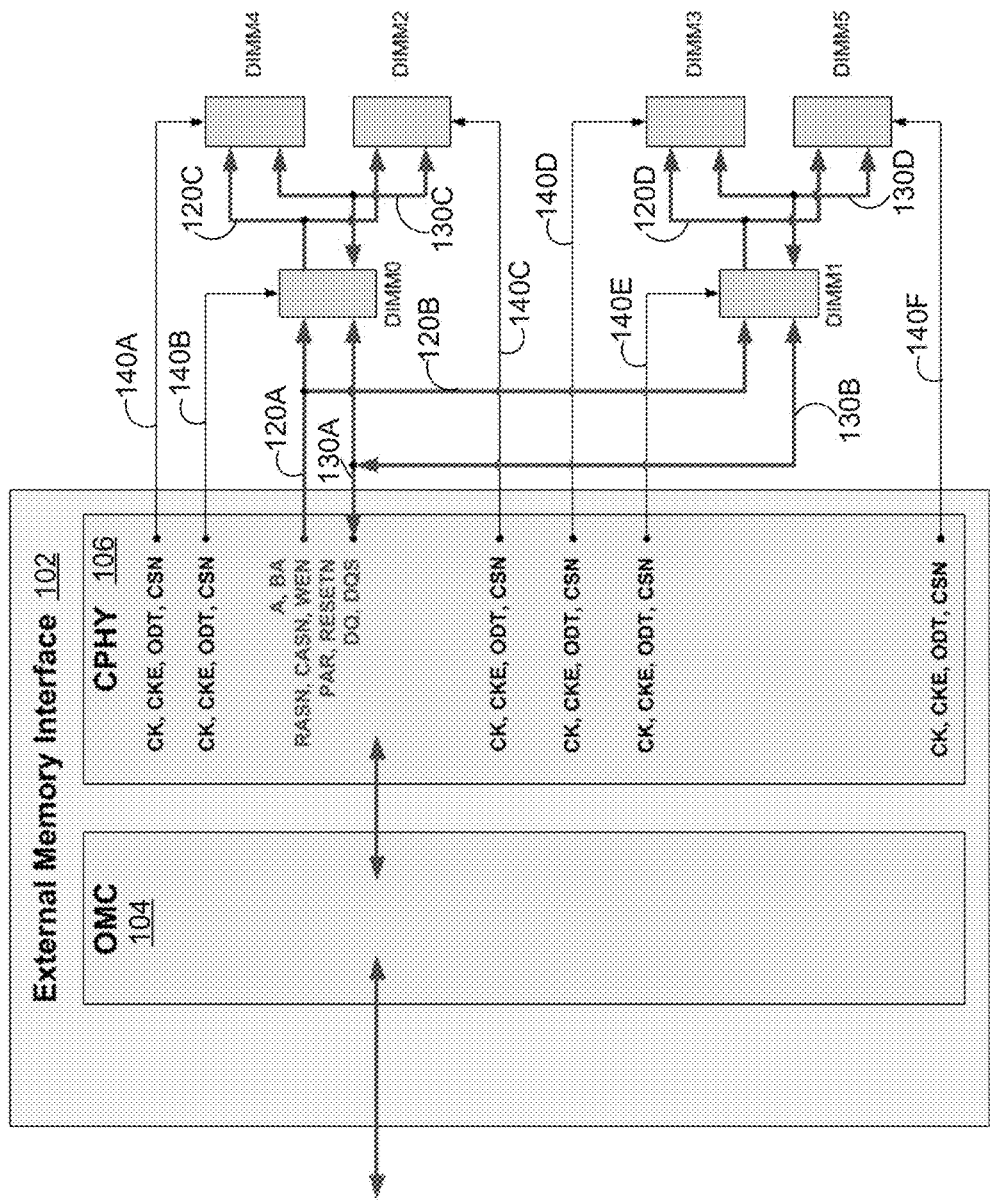
FIG. 1 shows a topology configuration supporting a plurality of memory modules, in accordance with various embodiments.

FIG. 1 shows a topology configuration supporting a plurality of memory modules, in accordance with various embodiments. FIG. 1 depicts a topology supporting a plurality of memory modules having a plurality to T split couplings. The topology supports a plurality of memory modules (e.g., 6 DIMMS) on a single channel and dynamic termination adjustment is used to maintain or improve signal integrity by reducing signal reflections. The exemplary topology 100 includes an external memory interface (EMI) 102, DIMMs 0-5, address/command transmission lines 120A-D, data bus transmission lines 130A-D, and data control transmission lines 140A-F.

The topology can be a double T topology having two levels of T splits supporting a total of 6 DIMMs on a channel or memory bus. For example, the first spilt or branch from CPHY (physical interface) 106 is to DIMMs 0 and 1. The second T splits or branches are from DIMM 0 to DIMMs 2 and 4 and from DIMM 1 to DIMMs 3 and 5.

The EMI 102 includes memory controller (OMC) 104 and physical interface (CPHY) 106. In some embodiments, the EMI 102 includes a field-programmable gate array (FPGA). The OMC 104 receives and responds to memory requests from one or more external computing systems or a computing system comprising EMI 102. The CPHY 106 provides a physical interface to memory modules DIMMs 0-5. The OMC 104 signals CPHY 106 to send memory operations to DIMMs 0-5. CPHY 106 is coupled to DIMMs 0-5 by address/command transmission lines 120A-D, data bus transmission lines 130A-D, and data control transmission lines 140A-F.

The OMC 104 and CPHY 106 dynamically control termination configurations of DIMMs 0-5 by signaling each of DIMMs 0-5 to configure their individual respective termination configurations of their address bus and data bus interfaces. The OMC 104 schedules read and write transactions to ensure that there is adequate time to change the address bus and data bus termination configurations of the memory modules before the memory access request is sent. The OMC 104 can further schedule the timing of read and write transactions to allow time for the address bus and data bus termination configurations of the memory modules to change before the next memory access request is sent to a memory module. For example, the OMC 104 may schedule operations such that there are one or more additional clock cycles between operations to allow time for the termination configurations of the memory modules to be changed. The CPHY 106 translates commands from the OMC 104 to one or more physical signals sent to DIMMs 0-5.

The DIMMs 0-5 are memory modules configured for storing data. In some embodiments, DIMMs 0-5 are double data rate type three synchronous dynamic random-access memory (DDR3 SDRAM) memory modules. However, embodiments are well suited for use with other types of memory modules, e.g., DDR4. The address/command transmission lines 120A-D are for transmitting commands, addresses, and/or control signals to DIMMs 0-5. The data bus transmission lines 130A-D are for transmitting data to or from DIMMs 0-5. The data control transmission lines 140A-F are for transmitting clock signals, signals associated with clock signals, and data bus termination signals.

The CPHY 106 uses the address/command transmission lines 120A-D, the data bus transmission lines 130A-D, and the data control transmission lines 140A-F to perform memory operations at the direction of the OMC 104. The OMC 104 in conjunction with the CPHY 106 dynamically controls the termination on DIMMs 0-5 via the address/command transmission lines 120A-D, the data control transmission lines 140A-F, as described herein. The dynamic termination adjustment is thus controlled and managed by the OMC 104 and the CPHY 106 (e.g., according to the configurations shown in FIGS. 3A-B and 5-7).

Figure 2:
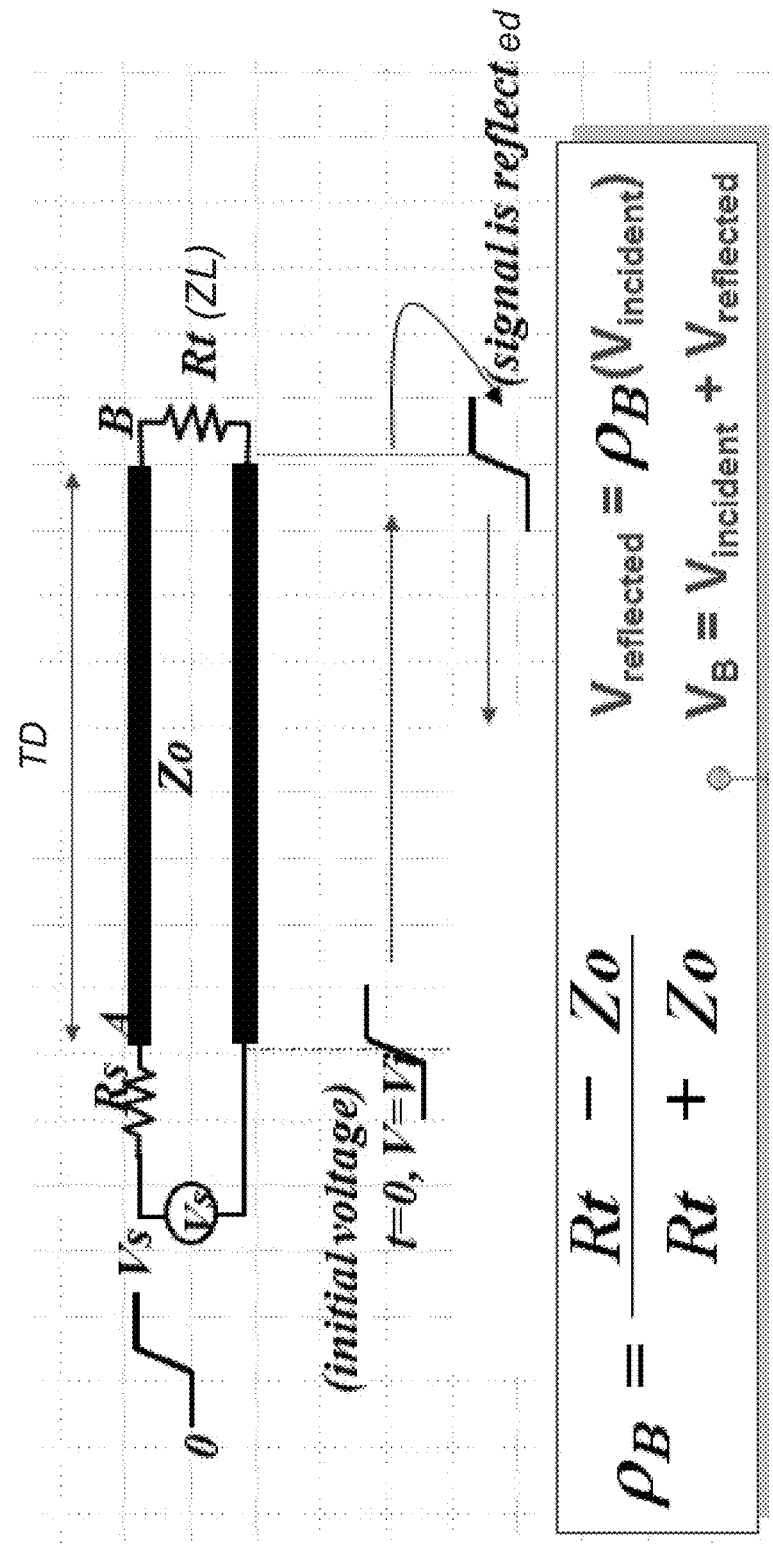
FIG. 2 shows an exemplary transmission line model, in accordance with various embodiments.

FIG. 2 shows an exemplary transmission line model 200, in accordance with various embodiments. FIG. 2 depicts an exemplary transmission line model used to model signal reflections for a single channel or memory bus that various memory modules coupled thereto.

The model corresponds to a termination in a printed circuit board (PCB) transmission line. A transmission line with a characteristic impedance Z0 is generally terminated at the far end with a load of impedance ZL. If ZL is greater than Z0, it will result in the incident wave and the reflected wave getting combined resulting in a wave with a greater amplitude.

The DIMM that the signal is being sent to, based on the address of the memory request, is referred to as "active." Other DIMMs coupled to the channel but not the target of the signal are referred to as "idle."

Embodiments use an open termination at the active DIMM resulting in a maximum swing and 100 ohms at the input bus termination (IBT) at the inactive DIMMs, or the other DIMMs on the channel, to properly terminate the load for the address bus, thereby avoiding unnecessary reflection. The IBT is the termination at the input of the address/command buffer of a memory module (e.g., an RDIMM or an LRDIMM). In some embodiments, a termination configuration of 75 ohms is used for DDR4 memory modules. Embodiments use an open ODT termination at the active DIMM, or the DIMM that is associated with an address of a memory request, resulting in a maximum swing and an ODT termination of 60 ohms for R1 and an open termination for R2 on the inactive DIMMs to properly terminate the load for the data bus, thereby avoiding unnecessary reflection. R1 refers to "memory rank 1" or rank 1 in a DIMM and R2 refers to "memory rank 2" or rank 2 in a DIMM. The memory rank is a set of dynamic random-access memory (DRAM) chips coupled to the same chip select in a memory module.

FIGS. 3A-B show exemplary dynamic termination configurations for an address/command bus, in accordance with various embodiments. FIGS. 3A-B depict an exemplary termination scheme configuration for an address/command bus (e.g., address/command transmission lines 120A-D of FIG. 1) in order to support a plurality of DIMMs (e.g., 6 DIMMs) connected to a single channel. The register clock driver (RCD) control word RC2 can be used to select a 100 ohms or 150 ohms IBT configuration. The RCD control word RC8 can be used to turn IBT on or off.

FIG. 3A shows a dynamic termination scheme table 300 of a plurality of registered or buffered DIMMs (RDIMMs) coupled to a single channel in accordance with various embodiments. In some embodiments, the buffer registers on the RDIMMs have an input bus termination (IBT) for command/control and address signals which are used to the control the termination impedance. The IBT scheme has been modified to be dynamic. The IBT is disabled or open on the active DIMM and the IBT is set to 100 ohms for non-active DIMMs thereby improving signal quality.

FIG. 3B shows a dynamic termination scheme table 350 of a plurality of load reduced DIMMs (LRDIMMs) coupled to a single channel in accordance with various embodiments. The IBT is disabled or open on the active DIMM and the IBT is set to 100 ohms (for example) for non-active DIMMs thereby improving signal quality.

FIGS. 4A-E show exemplary simulation results of various termination configurations, in accordance with various embodiments. FIG. 4A-E depict exemplary eye patterns with various dynamic termination configurations of the memory modules. The simulation results are shown for DDR3 memory modules with each memory module supporting termination configurations of open, 100 ohms, 150 ohms, and 300 ohms.

FIG. 4A shows an eye pattern 400 of a termination configuration with the IBT of the active DIMM set to 100 ohms and the IBT of the idle DIMMs set to 100 ohms. The eye opening is 256 millivolts. FIG. 4B shows an eye pattern 420 of a termination configuration with the IBT of the active DIMM set to 150 ohms and the IBT of the idle DIMMs set to 150 ohms. The eye opening is 300 millivolts. FIG. 4C shows an eye pattern 430 of a termination configuration with the IBT of the active DIMM set to 150 ohms and the IBT of the idle DIMMs set to 300 ohms. The eye opening is 338 millivolts. FIG. 4D shows an eye pattern 440 of a termination configuration with the IBT of the active DIMM set to 300 ohms and the IBT of the idle DIMMs set to 300 ohms. The eye opening is 413 millivolts. FIG. 4E shows an eye pattern 450 of a termination configuration with the IBT of the active DIMM set to open and the IBT of the idle DIMMs set to 100 ohms. The eye opening is 518 millivolts. FIG. 4E shows the best performance with the biggest eye opening while FIGS. 4A-D shows increased reflection as impedance is increased.

Figure 5:
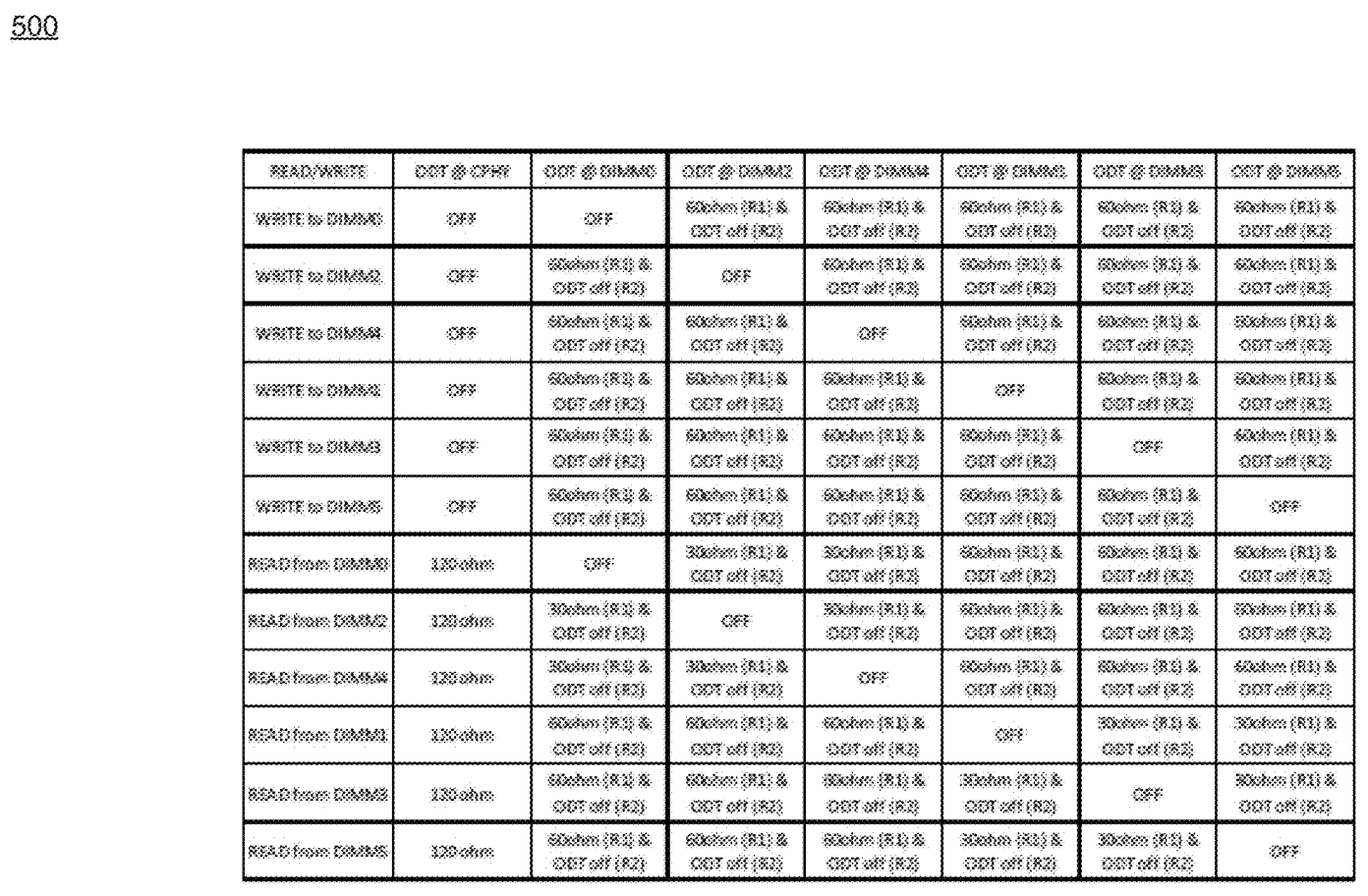

FIG. 5 shows exemplary dynamic termination configurations table 500 for a data bus with RDIMMs, in accordance with various embodiments. FIG. 5 depicts on-die termination (ODT) impedances of the memory modules (e.g., the DIMMs 0-5 of FIG. 1) for a data bus that are dynamically changed to enhance signal integrity and thereby performance. FIG. 5 depicts an exemplary ODT scheme for six dual rank RDIMMs with a balanced T-topology configuration and an 800 MT/s data rate. The DIMMs 0, 2, and 4 are in the same branch and the DIMMs 1, 3, and 5 are in the same branch. R1 refers to "memory rank 1" or rank 1 in a DIMM and R2 refers to "memory rank 2" or rank 2 in a DIMM. The memory rank is a set of dynamic random-access memory (DRAM) chips coupled to the same chip select in a memory module. DRAM chips in the same memory rank share a control signal to turn on/off ODT. The ODT configuration can be set using a DRAM register for storing an ODT value. The register can be programmed through use of a DRAM command.

For write operations, the ODT at the CPHY is off or open, the ODT for the active DIMM is off, and for the idle DIMMs, the ODT for R1 of the DIMM is set to 60 ohms and the ODT for R2 of the DIMMs is set to off. The memory controller (e.g., FPGA) can send a mode register set (MRS) command to revert the mode register for an inactive DIMM rank 1 to 60 ohms. This is done for an inactive DIMM that does not belong to the same branch as the active DIMM when a read operation or a write operation is performed.

For read operations, the ODT at the CPHY is set to 120 ohms and the ODT at the active DIMM is off. For the idle DIMMs in the branch where the active DIMM is located, the ODT for R1 of the DIMM is set to 30 ohms, and for the idle DIMMs in the branch where the active DIMM is not located, the ODT for R1 is set to 60 ohms, and the ODT for R2 of each of the idle DIMMs is set to off. The memory controller (e.g., FPGA) can send a MRS command to set 30 ohms into the mode register for an inactive DIMM rank 1. This is done for an inactive which DIMM belonging to the same branch as the active DIMM when a read operation is performed. The termination configurations of FIG. 5 are able to reduce reflection on the bidirectional data bus.

In some embodiments, the signaling of the memory modules can be performed by each line of a pair of ODT lines to each memory module being sent a high or low signal. In some embodiments, the signaling for the DIMMs is performed by pulling the ODT signals to R1 and R2 high or low. For example, a first ODT line can be sent a high signal to configure R1 of a DIMM and a second ODT line can be sent a low signal to configure R2 to have an off termination configuration.

FIG. 6 shows exemplary dynamic termination configurations table 600 for a data bus with LRDIMMs, in accordance with various embodiments. FIG. 6 depicts on-die termination (ODT) impedances of LRDIMMs (e.g., the DIMMs 0-5 of FIG. 1) for a data bus that are dynamically changed to enhance signal integrity and thereby performance. FIG. 6 depicts an exemplary ODT scheme for six LRDIMMs with a balanced T-topology configuration and an 800 MT/s data rate. The DIMMs 0, 2, and 4 are in the same branch and the DIMMs 1, 3, and 5 are in the same branch. For write operations, the ODT at the memory controller is off or open, the ODT for the active DIMM is 120 ohms, and for the idle DIMMs the ODT is 60 ohms. For read operations, the ODT at the memory controller is set to 120 ohms, the ODT at the active DIMM is off, and for the idle DIMMs, the ODT is set to 60 ohms. The termination configurations of FIG. 6 are able to reduce reflection on the bidirectional data bus.

FIG. 7 shows exemplary dynamic termination configurations table 700 for a data bus during the bringing up of a system, in accordance with various embodiments. FIG. 7 depicts on-die termination (ODT) impedances of the memory modules (e.g., the DIMMs 0-5 of FIG. 1) for a data bus that are dynamically changed to enhance signal integrity and thereby performance. The ODT scheme of FIG. 7 can be used with a memory module configuration where the middle two memory sockets (e.g., DIMMs 0-1) are populated and the other four memory sockets are unpopulated. For write operations, the ODT at the CPHY is off or open, the ODT for the active DIMM is 60 ohms, and for the idle DIMM, the ODT is 120 ohms. For read operations, the ODT at the CPHY is set to 120 ohms, the ODT at the active DIMM is off. For the idle DIMM, the ODT for R1 of the DIMM is set to 60 ohms, and the ODT for R2 of the DIMM is set to off. The termination configurations of FIG. 7 are able to reduce reflection on the bidirectional data bus.

With reference to the FIGS., the flowcharts illustrate example functions used by various embodiments for dynamic memory termination, as described herein. Although specific function blocks ("blocks") are disclosed in the FIGS., such steps are exemplary. That is, embodiments are well suited to performing various other blocks or variations of the blocks recited in the FIGS. It is appreciated that the blocks in the FIGS. can be performed in an order different than presented, and that not all of the blocks in the FIGS. need be performed.

Figure 8:
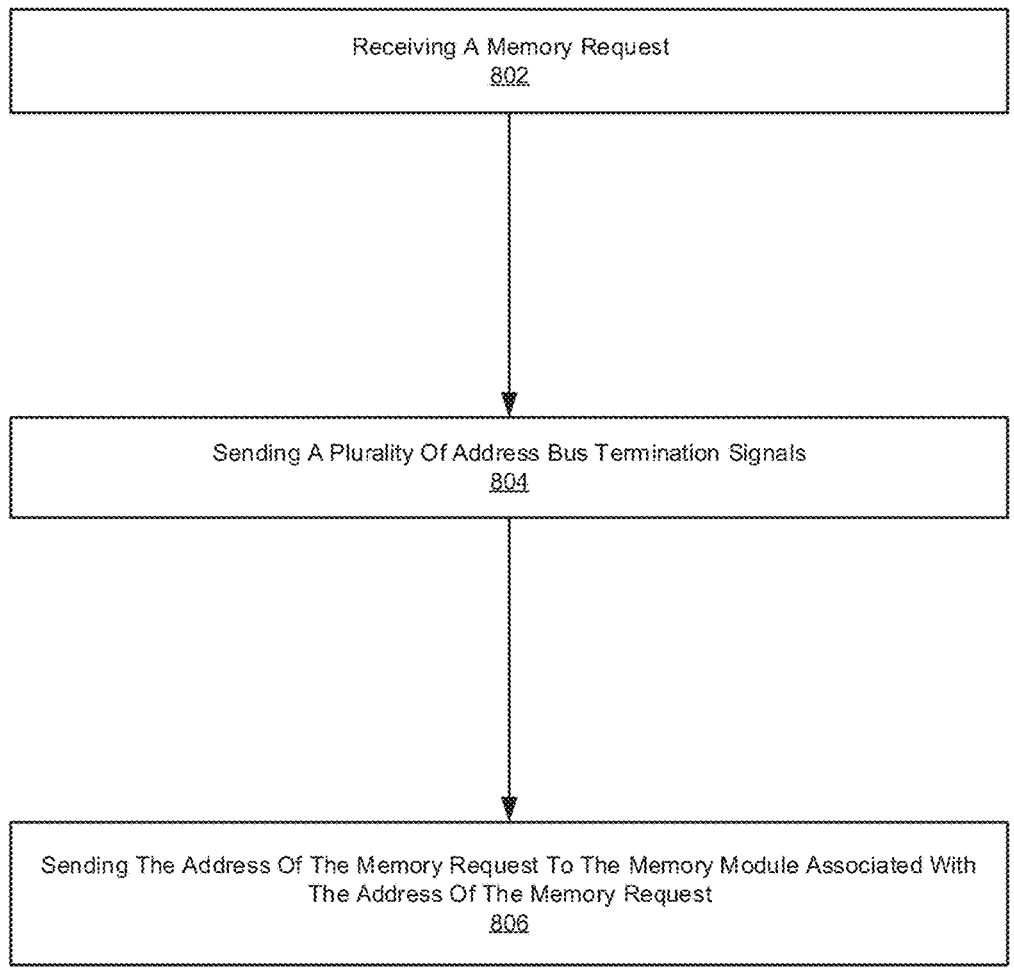
FIG. 8 shows a computer controlled process for configuring a dynamic termination scheme for an address/communication bus, in accordance with various embodiments.

FIG. 8 shows a computer controlled process for configuring a dynamic termination scheme for an address/communication bus, in accordance with various embodiments. FIG. 8 depicts a process 800 for configuring a termination configuration for each of a plurality of memory modules prior to sending an address or command to one of the plurality of memory modules. In some embodiments, the plurality of memory modules comprises six DIMMs coupled to a single channel or memory bus. The process 800 can be performed by a memory controller (e.g., the OMC 104) with a physical interface (e.g., CPHY 106).

At block 802, a memory request is received. The memory request includes an address. The memory request can be received from a processor or network interface card or other component at a memory controller.

At block 804, a plurality of address bus termination signals are sent. A first address bus termination signal is associated with a first termination configuration of a memory module associated with the address of the memory request. A second address bus termination signal is associated with a second termination configuration for the inactive or other memory modules of the plurality of memory modules. In some embodiments, the first termination signal is associated with a termination being open and is sent to the memory module associated with the address of the memory request.

In some embodiments, the plurality of address bus termination signals comprises an input bus termination (MT) configuration for each memory module of the plurality of memory modules. In some embodiments, the first termination configuration comprises an open termination configuration. The second termination configuration comprises a 100 ohm termination configuration.

At block 806, the address of the memory request is sent to the memory module associated with the address of the memory request.

Figure 9:
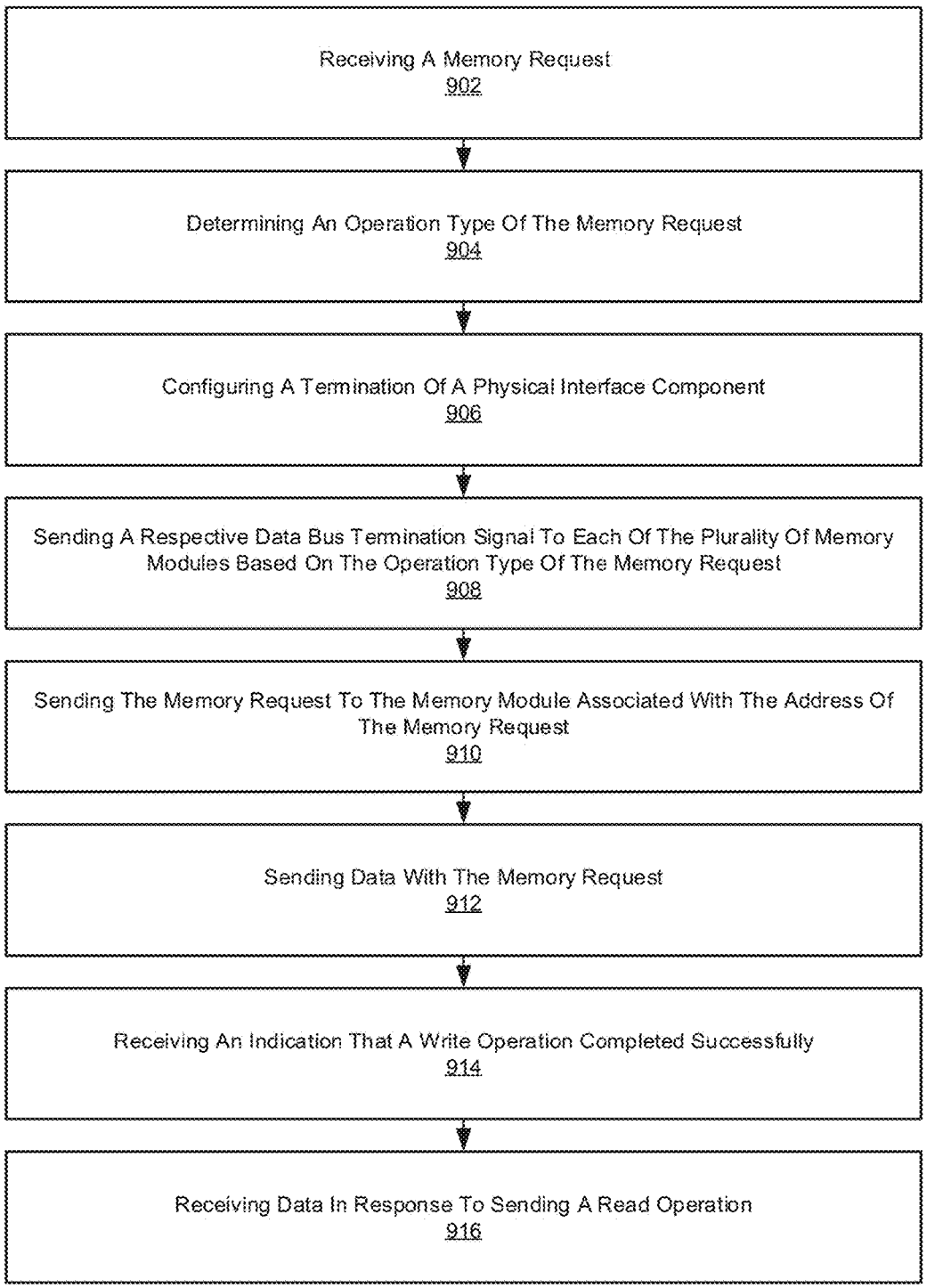
FIG. 9 shows a computer controlled process for configuring a dynamic termination scheme for a data bus, in accordance with various embodiments.

FIG. 9 shows a computer controlled process for configuring a dynamic termination scheme for a data bus, in accordance with various embodiments. FIG. 9 depicts a process 900 for configuring a termination configuration for the data bus interface of each of a plurality of memory modules prior to sending a read or write request to one of the memory modules. In some embodiments, the plurality of memory modules comprises six DIMMs coupled to a single channel. The process 900 can be performed by a memory controller (e.g., the OMC 104) with a physical interface (e.g., CPHY 106).

At block 902, a memory request is received. The memory request includes an address. The memory request can be received from a processor or network interface card (NIC) or other component at a memory controller.

At block 904, an operation type of the memory request is determined. Whether the memory request includes a write operation or a read operation is determined.

At block 906, a termination portion of a physical interface component is configured. In some embodiments, a PHY is configured to be in an open termination for write operations and a 120 ohms termination for read operations.

At block 908, a respective data bus termination signal is sent to each of the plurality of memory modules based on the operation type of the memory request. A first data bus termination signal associated with a first termination configuration for a first memory module associated with the address of the memory request is sent. A second data bus termination signal associated with a second termination configuration for the other memory modules is sent.

In some embodiments, the data bus termination signals are associated with an on-die termination (ODT) configuration. In some embodiments, a data bus termination signal is associated with an open termination configuration for a memory controller physical interface for a write operation. In some embodiments, a data bus termination signal is associated with a 120 ohms termination configuration for a memory controller physical interface for a read operation. In some embodiments, a data bus termination signal is associated with an open termination configuration for the memory module associated with the address of the memory request. In some embodiments, a data bus termination signal is associated with a 60 ohm termination configuration for a first resistor of a memory module and an open termination configuration for a second resistor of the memory module. In some embodiments, a data bus termination signal is associated with a 30 ohm termination configuration for a first resistor of a memory module and an open termination configuration for a second resistor of the memory module.

At block 910, the memory request is sent to a memory module associated with the address of the memory request. The memory request is performed by the memory module associated with the address of the memory request.

At block 912, data is sent with the memory request. Data to be written to a memory module is sent on the data bus.

At block 914, an indication is received that a write operation completed successfully.

At block 916, data is received in response to sending a read operation.

Figure 10:
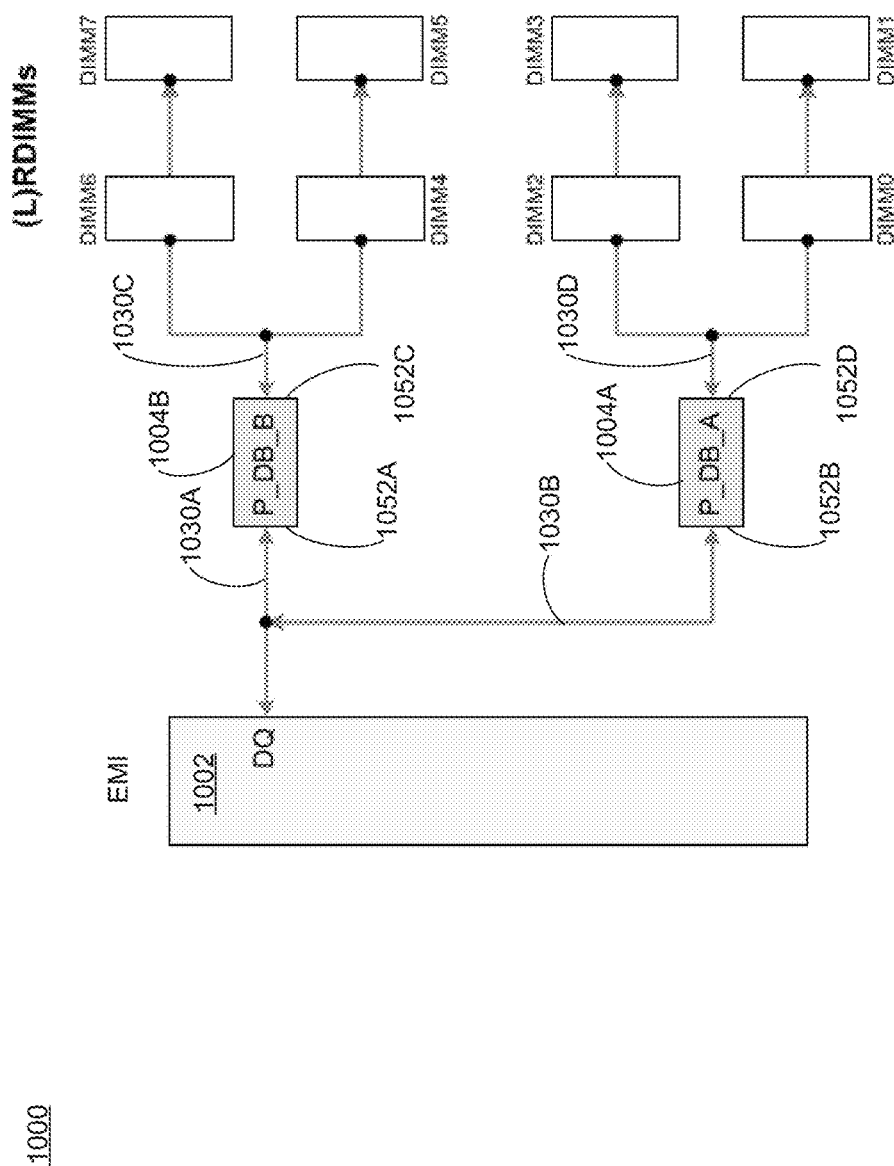
FIG. 10 shows a topology configuration of a data bus supporting a plurality of memory modules, in accordance with various embodiments.

FIG. 10 shows a topology configuration of a data bus supporting a plurality of memory modules, in accordance with various embodiments. FIG. 10 depicts a topology supporting a plurality of memory modules having a plurality of "T" split couplings. The topology supports a plurality of memory modules (e.g., 8 DIMMS) on a single channel and dynamic termination adjustment is used to maintain or improve signal integrity by reducing signal reflections. The exemplary topology 1000 includes an external memory interface (EMI) 1002, DIMMs 0-7, data bus transmission lines 1300A-D, and sets of primary data buffers 1004A-B. The dynamic termination adjustment is thus controlled and managed by the EMI 1002 (e.g., according to the configurations shown in FIGS. 11-12).

The topology can be a quadruple T topology having three levels of T splits supporting a total of 8 DIMMs on a channel or memory bus. For example, the first spilt or branch from CPHY (physical interface) of the EMI 1002 is to the primary data buffers 1004A-B. The second T splits or branches are from the set of primary buffers 1004A to DIMMs 0-1 and DIMMs 2-3 and from the set of primary data buffers 1004B to DIMMs 4-5 and DIMMs 6-7. The third T splits or branches are between DIMMs 0-1, DIMMs 2-3, DIMMs 4-5, and DIMMs 6-7.

The EMI 1002 can include a memory controller (e.g., memory controller (OMC) 104) and a physical interface (e.g., physical interface (CPHY) 106), as described herein. In some embodiments, the EMI 1002 includes a field-programmable gate array (FPGA).

The EMI 1002 dynamically controls termination configurations of the sets of primary data buffers 1004A-B and DIMMs 0-7 by signaling each of the primary data buffers of the sets of primary data buffers 1004A-B and DIMMs 0-7 to configure their individual respective termination configurations of their address bus and data bus interfaces. The EMI 1002 schedules read and write transactions to ensure that there is adequate time to change the address bus and data bus termination configurations of the memory modules before the memory access request is sent. The EMI 1002 can further schedule the timing of read and write transactions to allow time for the address bus and data bus termination configurations of the memory modules to change before the next memory access request is sent to a memory module. For example, the EMI 1002 may schedule operations such that there are one or more additional clock cycles between operations to allow time for the termination configurations of the memory modules to be changed.

The DIMMs 0-7 are memory modules configured for storing data. In some embodiments, DIMMs 0-7 are double data rate type four synchronous dynamic random-access memory (DDR4 SDRAM) memory modules. However, embodiments are well suited for use with other types of memory modules, e.g., DDR5, etc. The data bus transmission lines 1030A-D are for transmitting data to or from DIMMs 0-7. The data bus transmission lines 1030C-D can function as subchannels.

Each of the primary data buffers of the sets of primary data buffers 1004A-B include respective sets of primary interfaces 1052A-B and sets of secondary interfaces 1052C-D. The sets of primary interfaces 1052A-B are coupled to the EMI 1002. The sets of secondary interfaces 1052C-D are coupled to the DIMMS 0-7. The EMI 1002 can configure each respective interface of the respective sets of primary interfaces 1052A-B and sets of secondary interfaces 1052C-D with a particular ODT configuration (e.g., on/off and impedance). In some embodiments, the ODT configuration of the sets of data buffers 1004A-B can be configured by a buffer communication (BCOM) bus.

The EMI 1002 drives the sets of data buffers 1004A-B. In some embodiments, the sets of data buffers 1004A-B are on a motherboard. Each set of the sets of data buffers 1004A-B drives four of DIMMs of the DIMMs 0-7. Embodiments can support the use of standard DIMMs and buffers. In some embodiments, DIMMs 0-7 are DDR4 DIMMs. The memory topology 1000 is shown supporting eight DIMMs per channel. The DIMMs 0-7 can have four ranks per DIMM.

The ODT configurations, described herein, RTT_1, RTT_2, RTT_NOM, and RTT_WR are associated with ODT on/off and/or ODT impedance values and may be different or vary between DIMMs and interfaces of the primary buffers.

Figure 11:
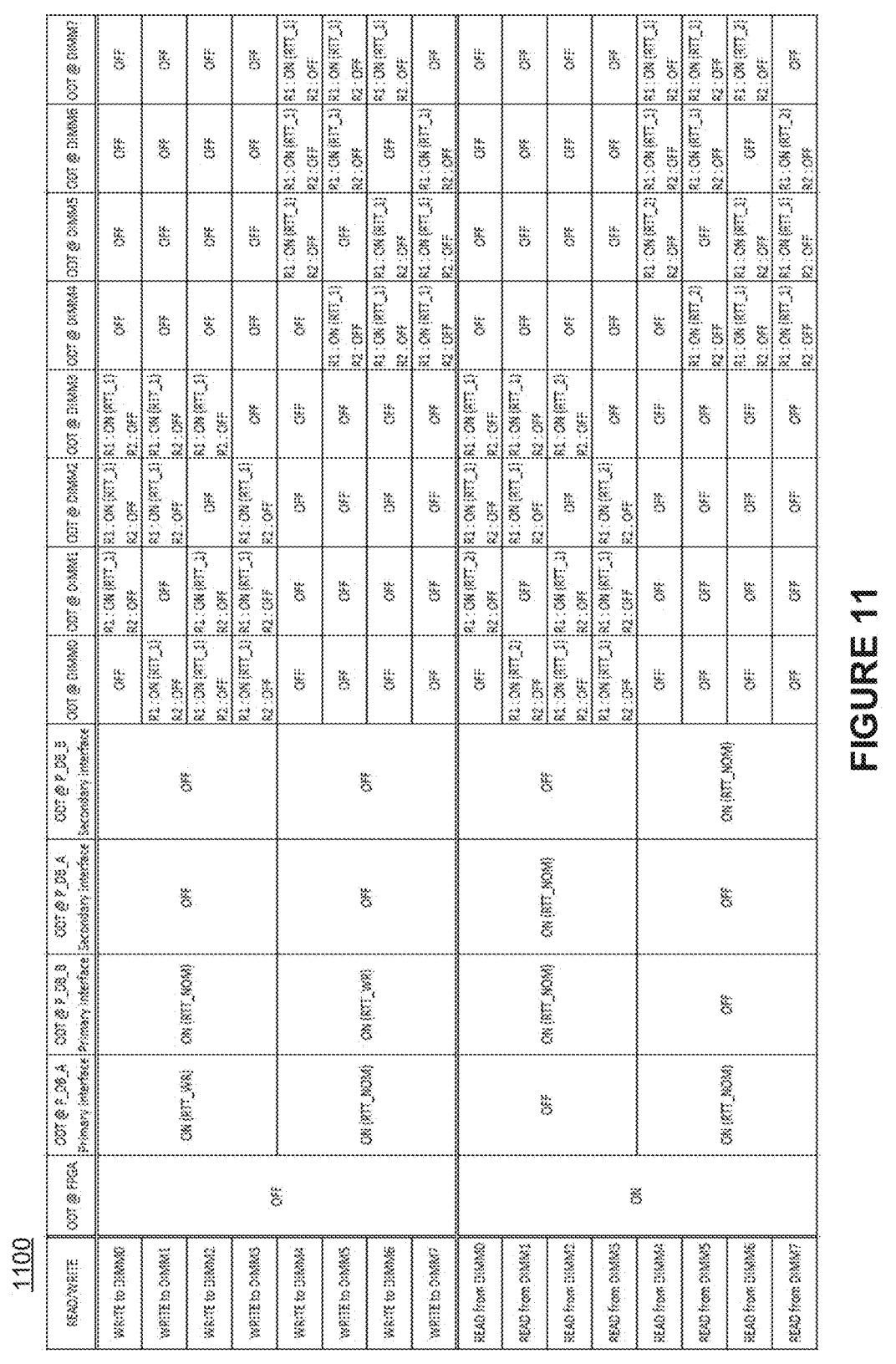

FIG. 11 shows exemplary dynamic termination configurations table 1100 for a data bus with RDIMMs, in accordance with various embodiments. FIG. 11 depicts ODT impedances of memory modules (e.g., the DIMMs 0-7 of FIG. 10) for a data bus (e.g., data bus transmission lines 1300A-D) that are dynamically changed to enhance signal integrity and thereby performance. FIG. 11 depicts an exemplary ODT scheme for eight dual rank RDIMMs with a balanced triple T-topology configuration. The DIMMs 0-3 are in the same branch and the DIMMs 4-7 are in the same branch. R1 refers to "memory rank 1" or rank 1 in a DIMM and R2 refers to "memory rank 2" or rank 2 in a DIMM. The memory rank is a set of dynamic random-access memory (DRAM) chips coupled to the same chip select in a memory module. DRAM chips in the same memory rank share a control signal to turn on/off ODT. The ODT configuration can be set using a DRAM register for storing an ODT value. The register can be programmed through use of a DRAM command. The values of RTT_1 and RTT_2 are associated with ODT impedance values and may be different or vary between DIMMs. FIG. 11 further depicts ODT values (RTT_NOM or RTT_WR) for primary interfaces and secondary interfaces of primary data buffers (e.g., sets of primary interfaces 1052A-B and sets of secondary interfaces 1052C-D), which may vary between buffers.

For write operations, the ODT at the EMI is off or open, the ODT for the active DIMM is off, and for the idle DIMMs in the same branch, the ODT for R1 of the DIMM is set to on (RTT_1) and the ODT for R2 of the DIMMs is set to off. For write operations, the ODT for DIMMs in the idle branch (e.g., the branch with DIMMs that are not being accessed), the ODT is off. The EMI (e.g., memory controller or FPGA) can send a mode register set (MRS) command to revert the mode register for a DIMM rank in the idle branch to off. This is done for an inactive DIMM that does not belong to the same branch as the active DIMM when a read operation or a write operation is performed.

For read operations, the ODT at the EMI is set to on and the ODT at the active DIMM is off. For the idle DIMMs in the branch where the active DIMM is located, the ODT for R1 of the DIMM is set to on with a value of RTT_2 or RTT_1 and the ODT for R2 is set to off. For the idle DIMMs in the branch where the active DIMM is not located the ODT is set to off. The EMI (e.g., memory controller or FPGA) can send a MRS command to set the mode register for a DIMM in the idle branch to off. This is done for an inactive DIMM belonging to the idle or inactive branch when a read operation is performed. The termination configurations of FIG. 11 are able to reduce reflection on the bidirectional data buses.

In some embodiments, the signaling of the memory modules can be performed by each line of a pair of ODT lines to each memory module being sent a high or low signal. In some embodiments, the DIMMs signaling is performed by pulling the ODT signals to R1 and R2 high or low. For example, a first ODT line can be sent a high signal to configure R1 of a DIMM and a second ODT line can be sent a low signal to configure R2 to have an off termination configuration.

Figure 12:
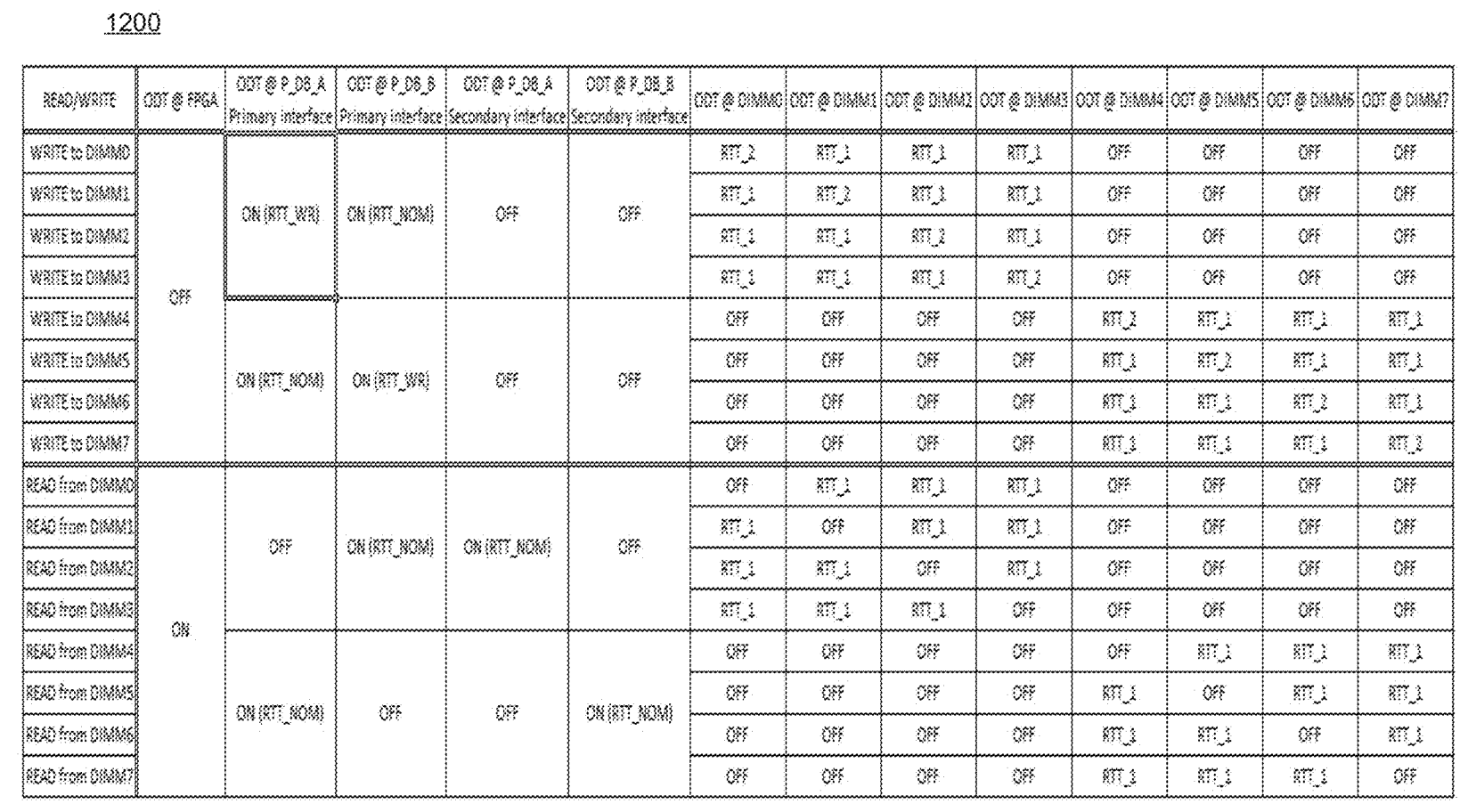

FIG. 12 shows exemplary dynamic termination configurations table 1200 for a data bus with LRDIMMs, in accordance with various embodiments. FIG. 12 depicts ODT impedances of LRDIMMs (e.g., the DIMMs 0-7 of FIG. 10) for a data bus (e.g., data bus transmission lines 1300A-D) that are dynamically changed to enhance signal integrity and thereby performance. FIG. 12 depicts an exemplary ODT scheme for eight LRDIMMs with a triple balanced T-topology configuration. The DIMMs 0-3 are in the same branch and the DIMMs 4-7 are in the same branch.

For write operations, the ODT at the memory controller is off or open, the ODT for the active DIMM is RTT_2, and for the idle DIMMs in the same branch the ODT is RTT_1. The ODT for the DIMMs in the inactive branch are set to off. The primary interfaces of the primary buffer for the active branch are set to on with a value of RTT_WR. The secondary interfaces of the primary buffer for the active branch are set to off. The primary interfaces of the primary buffer for the inactive branch are set to on with a value of RTT_NOM. The secondary interfaces of the primary buffer for the inactive branch are set to off.

For read operations, the ODT at the memory controller is set to on, the ODT at the active DIMM is off, and for the idle DIMMs in the active branch, the ODT is set to RTT_1. The ODT for the DIMMs in the inactive branch are set to off. The primary interfaces of the primary buffer for the active branch are set to off. The secondary interfaces of the primary buffer for the active branch are set to on with a value of RTT_NOM. The primary interfaces of the primary buffer for the inactive branch are set to on with a value of RTT_NOM. The secondary interfaces of the primary buffer for the inactive branch are set to off.

Figure 13:
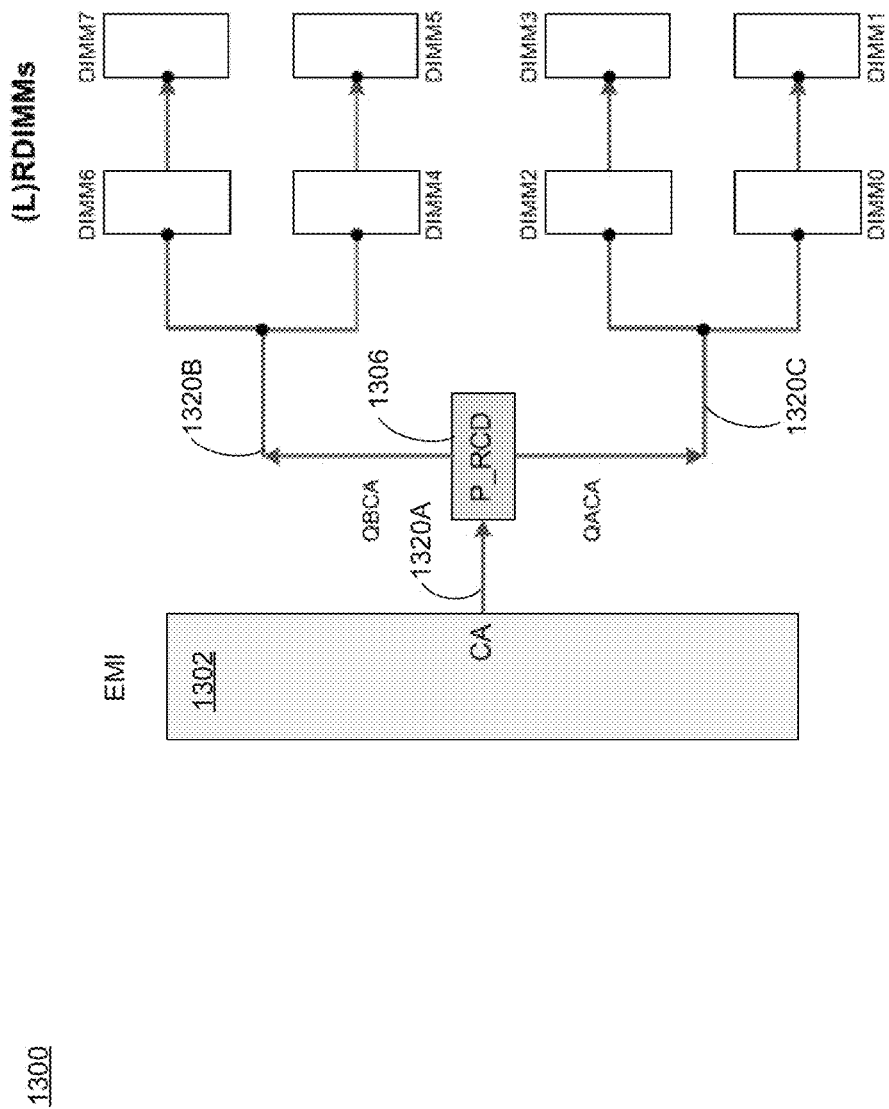
FIG. 13 shows a topology configuration of an address/command bus supporting a plurality of memory modules, in accordance with various embodiments.

FIG. 13 shows a topology configuration of an address/command bus supporting a plurality of memory modules, in accordance with various embodiments. FIG. 13 depicts an exemplary topology supporting a plurality of memory modules having a plurality to T split couplings. The topology supports a plurality of memory modules (e.g., 8 DIMMS) on a single channel and dynamic termination adjustment is used to maintain or improve signal integrity by reducing signal reflections. The exemplary topology 1300 includes an external memory interface (EMI) 1302, DIMMs 0-7, address/command transmission bus lines 1320A-C, and a primary registered clock driver (RCD) 1306. The address/command transmission bus lines 1320B-C can function as subchannels. The dynamic termination adjustment is thus controlled and managed by the EMI 1302 (e.g., according to the configurations shown in FIG. 14).

The topology 1300 for instance can be a triple T topology having two levels of T splits supporting a total of 8 DIMMs on a channel or memory bus. For example, the first spilt or branch from the primary RCD 1306 is to sets of DIMMs. The second T splits or branches are between the pairs of DIMMs (e.g., the second T splits goes to DIMMs 6-7 on one side and DIMMs 4-5 on the other side). The primary RCD 1306 buffers command/address signals out to the DIMMs 0-7.

The EMI 1002 can include a memory controller (e.g., memory controller (OMC) 104) and a physical interface (e.g., physical interface (CPHY) 106), as described herein. In some embodiments, the EMI 1002 includes a field-programmable gate array (FPGA).

The EMI 1002 dynamically controls termination configurations (e.g., IBT) of the sets of primary RCD 1306 and DIMMs 0-7 to configure their individual respective termination configurations of their address bus interfaces. The EMI 1002 schedules address/command bus termination configurations to ensure that there is adequate time to change the address bus termination configurations of the memory modules and primary RCD before the memory access request is sent. The EMI 1002 can further schedule the timing of read and write transactions to allow time for the address bus termination configurations of the memory modules and the primary RCD to change before the next memory access request is sent to a memory module. For example, the EMI 1002 may schedule operations such that there are one or more additional clock cycles between operations to allow time for the termination configurations of the memory modules and primary RCD to be changed.

The DIMMs 0-7 are memory modules configured for storing data. In some embodiments, DIMMs 0-7 are double data rate type three synchronous dynamic random-access memory (DDR4 SDRAM) memory modules. However, embodiments are well suited for use with other types of memory modules, e.g., DDR5, etc. The data bus transmission lines 1030A-D are for transmitting data to or from DIMMs 0-7.

In some embodiments, the primary RCD 1306 is on a motherboard. The primary RCD drives the DIMMs 0-7. Embodiments can support the use of standard DIMMs and buffers. In some embodiments, DIMMs 0-7 are DDR4 DIMMs. The memory topology 1300 is shown supporting eight DIMMs per channel. The DIMMs 0-7 can have four ranks per DIMM.

The IBT configurations, described herein, ON, OFF, and RTT are associated with IBT on/off and/or IBT impedance values and may be different or vary between DIMMs and the primary RCD.

FIG. 14 show exemplary dynamic termination configurations for an address/command bus, in accordance with various embodiments. FIG. 14 depicts an exemplary termination scheme table 1400 of configurations for an address/command bus (e.g., the address/command transmission bus lines 1320A-C) in order to support a plurality of DIMMs (e.g., 8 DIMMs, the DIMMs 0-7 of FIG. 13) connected to a single channel.

In some embodiments, the buffer registers on the DIMMs 0-7 have an IBT for command/control and address signals which are used to the control the termination impedance. The IBT scheme has been modified to be dynamic.

For read and write operations, the IBT is off or open on the primary RCD, the IBT of the active DIMM is set to off, and the IBT of the DIMMs in the active branch are set to RTT. The IBT is off for the DIMMs in the inactive branch.

Figure 15:
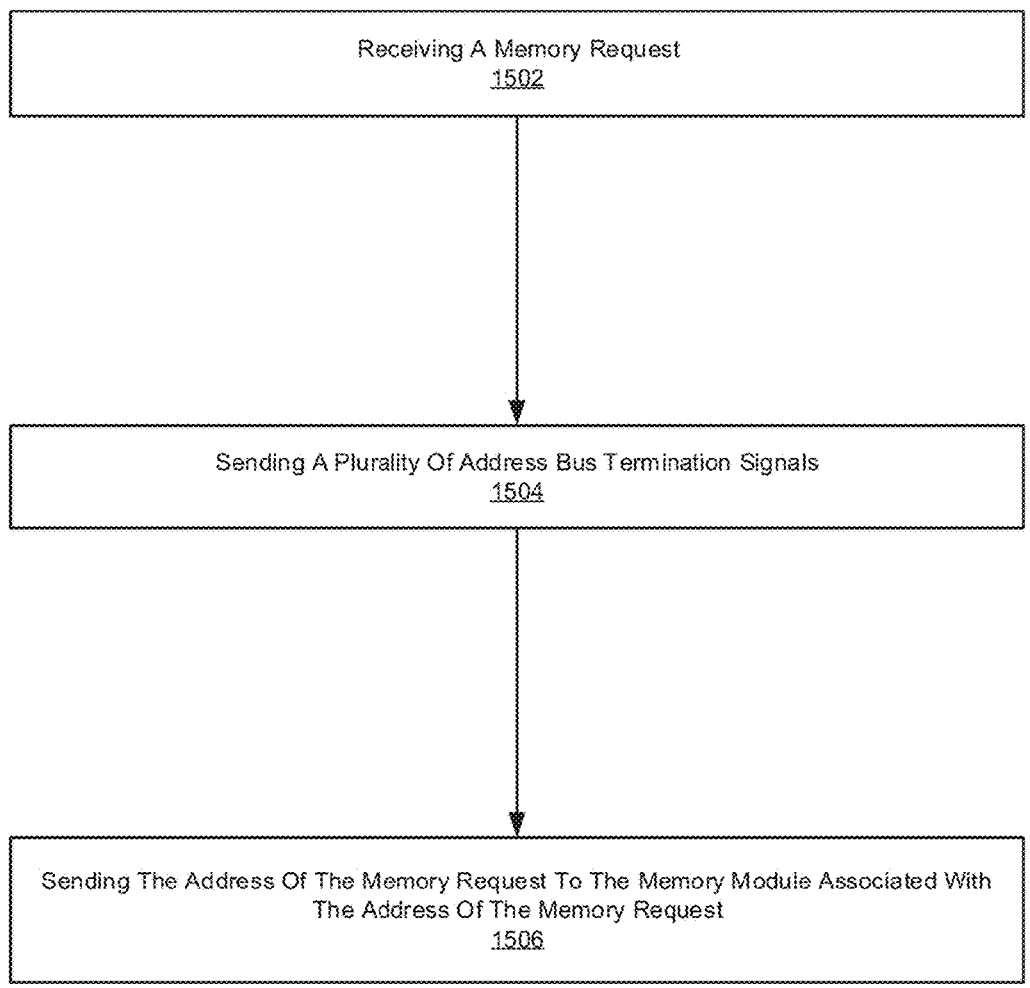
FIG. 15 shows a computer controlled process for configuring a dynamic termination scheme for an address/communication bus, in accordance with various embodiments.

FIG. 15 shows a computer controlled process for configuring a dynamic termination scheme for an address/communication bus, in accordance with various embodiments. FIG. 15 depicts an exemplary process 1500 for configuring a termination configuration for each of a plurality of memory modules prior to sending an address or command to one of the plurality of memory modules. In some embodiments, the plurality of memory modules comprises eight DIMMs coupled to a single channel or memory bus. The process 1500 can be performed by a memory controller (e.g., the OMC 104) with a physical interface (e.g., CPHY 106).

At block 1502, a memory request is received. The memory request includes an address. The memory request can be received from a processor or network interface card or other component at a memory controller.

At block 1504, a plurality of address bus termination signals are sent. A first address bus termination signal is associated with a first termination configuration of a memory module associated with the address of the memory request. A second address bus termination signal is associated with a second termination configuration for the inactive or other memory modules of the plurality of memory modules. A third address bus termination signal is associated with a primary RCD termination configuration.

In some embodiments, the plurality of address bus termination signals comprises an input bus termination (MT) configuration for each memory module of the plurality of memory modules. In some embodiments, the first termination signal is associated with a termination being off or open and is sent to the memory module associated with the address of the memory request. The second termination configuration comprises a RTT value termination configuration. The third termination configuration comprises an off or open termination configuration for a primary RCD.

At block 1506, the address of the memory request is sent to the memory module associated with the address of the memory request.

Figure 16:
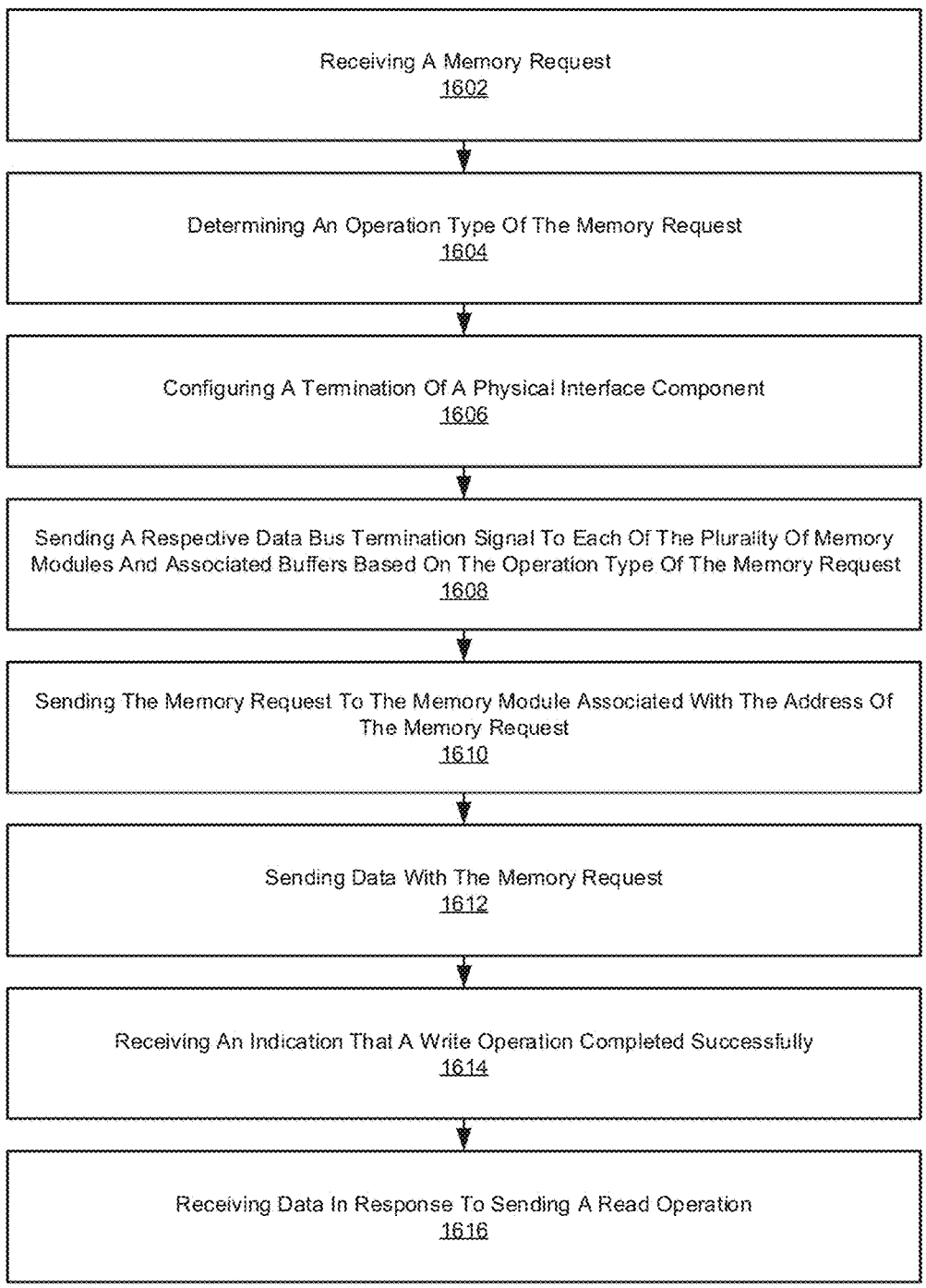
FIG. 16 shows a computer controlled process for configuring a dynamic termination scheme for a data bus, in accordance with various embodiments.

FIG. 16 shows a computer controlled process for configuring a dynamic termination scheme for a data bus, in accordance with various embodiments. FIG. 16 depicts a process 1600 for configuring a termination configuration for the data bus interface of each of a plurality of memory modules and sets of primary data buffers prior to sending a read or write request to one of the memory modules. In some embodiments, the plurality of memory modules comprises eight DIMMs coupled to a single channel. The process 1600 can be performed by a memory controller (e.g., the OMC 104) with a physical interface (e.g., CPHY 106).

At block 1602, a memory request is received. The memory request includes an address. The memory request can be received from a processor or network interface card (NIC) or other component at a memory controller.

At block 1604, an operation type of the memory request is determined. Whether the memory request includes a write operation or a read operation is determined.

At block 1606, a termination portion of a physical interface component is configured. In some embodiments, a PHY is configured to be in an off termination for write operations and an on termination configuration for read operations.

At block 1608, a respective data bus termination signal is sent to each of the plurality of memory modules and associated buffers based on the operation type of the memory request. A first data bus termination signal associated with a first termination configuration for a first memory module associated with the address of the memory request is sent. A second data bus termination signal associated with a second termination configuration for the other memory modules is sent. A third data bus termination signal is associated with primary and secondary interfaces of primary data buffers.

In some embodiments, the data bus termination signals are associated with an on-die termination (ODT) configuration, as described herein. In some embodiments, a data bus termination signal is associated with an off termination configuration for a memory controller physical interface for a write operation. In some embodiments, a data bus termination signal is associated with an off or open termination configuration for the memory module associated with the address of the memory request.

At block 1610, the memory request is sent to a memory module associated with the address of the memory request. The memory request is performed by the memory module associated with the address of the memory request.

At block 1612, data is sent with the memory request. Data to be written to a memory module is sent on the data bus.

At block 1614, an indication is received that a write operation completed successfully.

At block 1616, data is received in response to sending a read operation.

Figure 17:
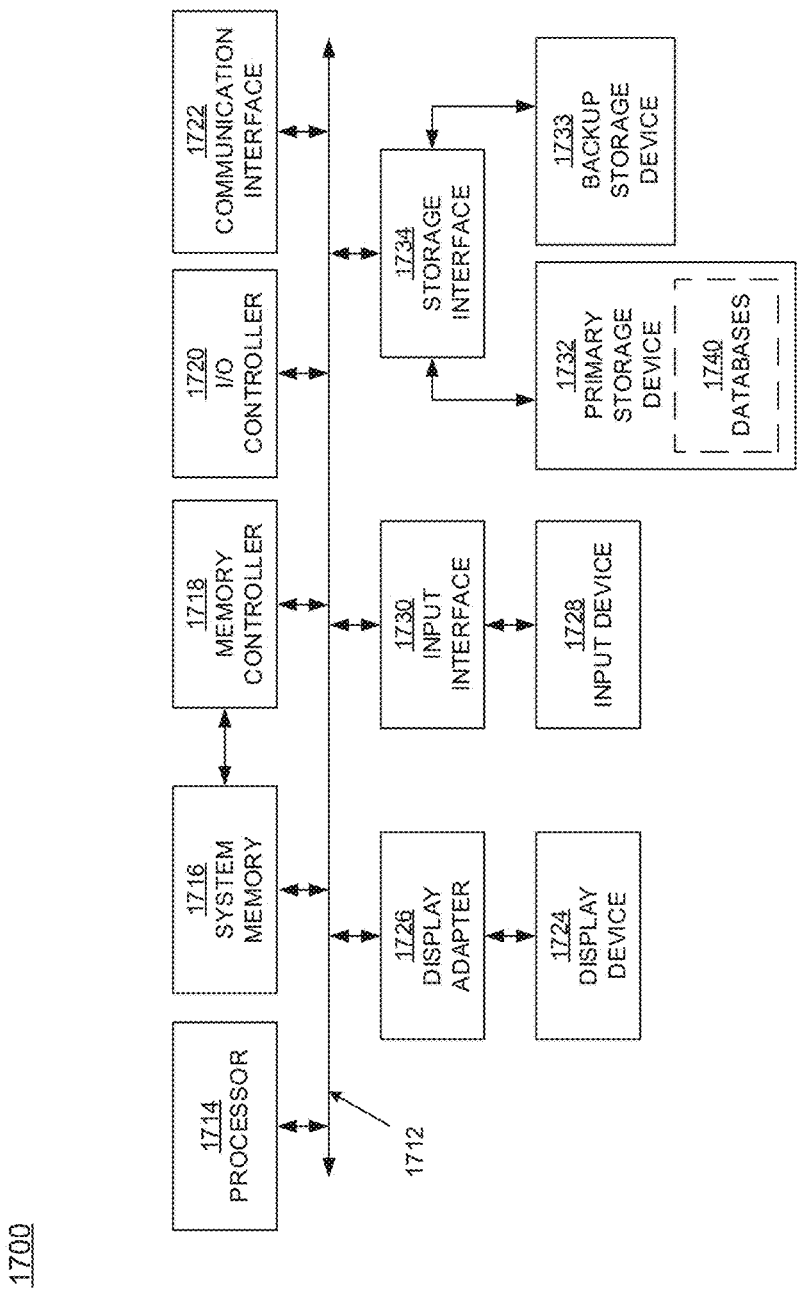
FIG. 17 is a block diagram of an exemplary computing system including various embodiments.

FIG. 17 is a block diagram of an exemplary computing system 1700 including various embodiments. Computing system 1700 broadly represents any single or multi-processor computing device or system capable of executing computer-readable instructions. Examples of computing system 1700 include, without limitation, workstations, laptops, client-side terminals, servers, distributed computing systems, handheld devices, or any other computing system or device. In its most basic configuration, computing system 1700 may include at least one processor 1714 and a system memory 1716.

Processor 1714 generally represents any type or form of processing unit capable of processing data or interpreting and executing instructions. In certain embodiments, processor 1714 may receive instructions from a software application or module. These instructions may cause processor 1714 to perform the functions of one or more of the example embodiments described and/or illustrated herein. For example, processor 1714 may perform and/or be a means for performing, either alone or in combination with other elements, one or more of the identifying, determining, using, implementing, translating, tracking, receiving, moving, and providing described herein. Processor 1714 may also perform and/or be a means for performing any other steps, methods, or processes described and/or illustrated herein.

System memory 1716 generally represents any type or form of volatile or non-volatile storage device or medium capable of storing data and/or other computer-readable instructions. Examples of system memory 1716 include, without limitation, RAM, ROM, FLASH memory, or any other suitable memory device. Although not required, in certain embodiments computing system 1700 may include both a volatile memory unit (such as, for example, system memory 1716) and a non-volatile storage device (such as, for example, primary storage device 1732. In some embodiments, the system memory 1716 is configured to dynamically adjust its termination configurations (e.g., according to the configurations shown in FIGS. 3A-B, 5-7, 11-12, and 14).

Computing system 1700 may also include one or more components or elements in addition to processor 1714 and system memory 1716. For example, in the embodiment of FIG. 17, computing system 1700 includes a memory controller 1718, an I/O controller 1720, and a communication interface 1722 In some embodiments, the memory controller 1718 is configured for dynamically managing and configuring the termination configurations of the system memory 1716 (e.g., according to the configurations shown in FIGS. 3A-B, 5-7, 11-12, and 14).

Communication infrastructure 1712 generally represents any type or form of infrastructure capable of facilitating communication between one or more components of a computing device. Examples of communication infrastructure 1712 include, without limitation, a communication bus (such as an ISA, PCI, PCIe, or similar bus) and a network. In one embodiment, system memory 1716 communicates via a dedicated memory bus.

Memory controller 1718 generally represents any type or form of device capable of handling memory or data or controlling communication between one or more components of computing system 1700. For example, memory controller 1718 may control communication between processor 1714, system memory 1716, and I/O controller 1720 via communication infrastructure 1712. Memory controller 1718 may perform and/or be a means for performing, either alone or in combination with other elements, one or more of the operations or features described herein.

I/O controller 1720 generally represents any type or form of module capable of coordinating and/or controlling the input and output functions of a computing device. For example, I/O controller 1720 may control or facilitate transfer of data between one or more elements of computing system 1700, such as processor 1714, system memory 1716, communication interface 1722, display adapter 1726, input interface 1730, and storage interface 1734. I/O controller 1720 may be used, for example, to perform and/or be a means for performing, either alone or in combination with other elements, one or more of the operations described herein. I/O controller 1720 may also be used to perform and/or be a means for performing other operations and features set forth in the instant disclosure.

Communication interface 1722 broadly represents any type or form of communication device or adapter capable of facilitating communication between example computing system 1700 and one or more additional devices. For example, communication interface 1722 may facilitate communication between computing system 1700 and a private or public network including additional computing systems. Examples of communication interface 1722 include, without limitation, a wired network interface (such as a network interface card), a wireless network interface (such as a wireless network interface card), a modem, and any other suitable interface. In one embodiment, communication interface 1722 provides a direct connection to a remote server via a direct link to a network, such as the Internet. Communication interface 1722 may also indirectly provide such a connection through, for example, a local area network (such as an Ethernet network), a personal area network, a telephone or cable network, a cellular telephone connection, a satellite data connection, or any other suitable connection.

Communication interface 1722 may also represent a host adapter configured to facilitate communication between computing system 1700 and one or more additional network or storage devices via an external bus or communications channel. Examples of host adapters include, without limitation, SCSI host adapters, USB host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 1722 may also allow computing system 1700 to engage in distributed or remote computing. For example, communication interface 1722 may receive instructions from a remote device or send instructions to a remote device for execution. Communication interface 1722 may perform and/or be a means for performing, either alone or in combination with other elements, one or more of the operations disclosed herein. Communication interface 1722 may also be used to perform and/or be a means for performing other operations and features set forth in the instant disclosure.

As illustrated in FIG. 17, computing system 1700 may also include at least one display device 1724 coupled to communication infrastructure 1712 via a display adapter 1726. Display device 1724 generally represents any type or form of device capable of visually displaying information forwarded by display adapter 1726. Similarly, display adapter 1726 generally represents any type or form of device configured to forward graphics, text, and other data from communication infrastructure 1712 (or from a frame buffer, as known in the art) for display on display device 1724.

As illustrated in FIG. 17, computing system 1700 may also include at least one input device 1728 coupled to communication infrastructure 1712 via an input interface 1730. Input device 1728 generally represents any type or form of input device capable of providing input, either computer- or human-generated, to computing system 1700. Examples of input device 1728 include, without limitation, a keyboard, a pointing device, a speech recognition device, or any other input device. In one embodiment, input device 1728 may perform and/or be a means for performing, either alone or in combination with other elements, one or more of the operations disclosed herein. Input device 1728 may also be used to perform and/or be a means for performing other operations and features set forth in the instant disclosure.

As illustrated in FIG. 17, computing system 1700 may also include a primary storage device 1732 and a backup storage device 1733 coupled to communication infrastructure 1712 via a storage interface 1734. Storage devices 1732 and 1733 generally represent any type or form of storage device or medium capable of storing data and/or other computer-readable instructions. For example, storage devices 1732 and 1733 may be a magnetic disk drive (e.g., a so-called hard drive), a floppy disk drive, a magnetic tape drive, an optical disk drive, a FLASH drive, or the like. Storage interface 1734 generally represents any type or form of interface or device for transferring data between storage devices 1732 and 1733 and other components of computing system 1700.

In one example, databases 1740 may be stored in primary storage device 1732. Databases 1740 may represent portions of a single database or computing device or a plurality of databases or computing devices. For example, databases 1740 may represent (be stored on) a portion of computing system 1700 and/or portions of example network architecture 1800 in FIG. 18 (below). Alternatively, databases 1740 may represent (be stored on) one or more physically separate devices capable of being accessed by a computing device, such as computing system 1700 and/or portions of network architecture 1800.

Continuing with reference to FIG. 17, storage devices 1732 and 1733 may be configured to read from and/or write to a removable storage unit configured to store computer software, data, or other computer-readable information. Examples of suitable removable storage units include, without limitation, a floppy disk, a magnetic tape, an optical disk, a FLASH memory device, or the like. Storage devices 1732 and 1733 may also include other similar structures or devices for allowing computer software, data, or other computer-readable instructions to be loaded into computing system 1700. For example, storage devices 1732 and 1733 may be configured to read and write software, data, or other computer-readable information. Storage devices 1732 and 1733 may also be a part of computing system 1700 or may be separate devices accessed through other interface systems.

Storage devices 1732 and 1733 may be used to perform, and/or be a means for performing, either alone or in combination with other elements, one or more of the operations disclosed herein. Storage devices 1732 and 1733 may also be used to perform, and/or be a means for performing, other operations and features set forth in the instant disclosure.

Many other devices or subsystems may be connected to computing system 1700. Conversely, all of the components and devices illustrated in FIG. 17 need not be present to practice the embodiments described herein. The devices and subsystems referenced above may also be interconnected in different ways from that shown in FIG. 17. Computing system 1700 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 1700. All or a portion of the computer program stored on the computer-readable medium may then be stored in system memory 1716 and/or various portions of storage devices 1732 and 1733. When executed by processor 1714, a computer program loaded into computing system 1700 may cause processor 1714 to perform and/or be a means for performing the functions of the example embodiments described and/or illustrated herein. Additionally or alternatively, the example embodiments described and/or illustrated herein may be implemented in firmware and/or hardware. For example, computing system 1700 may be configured as an ASIC adapted to implement one or more of the embodiments disclosed herein.

Figure 18:
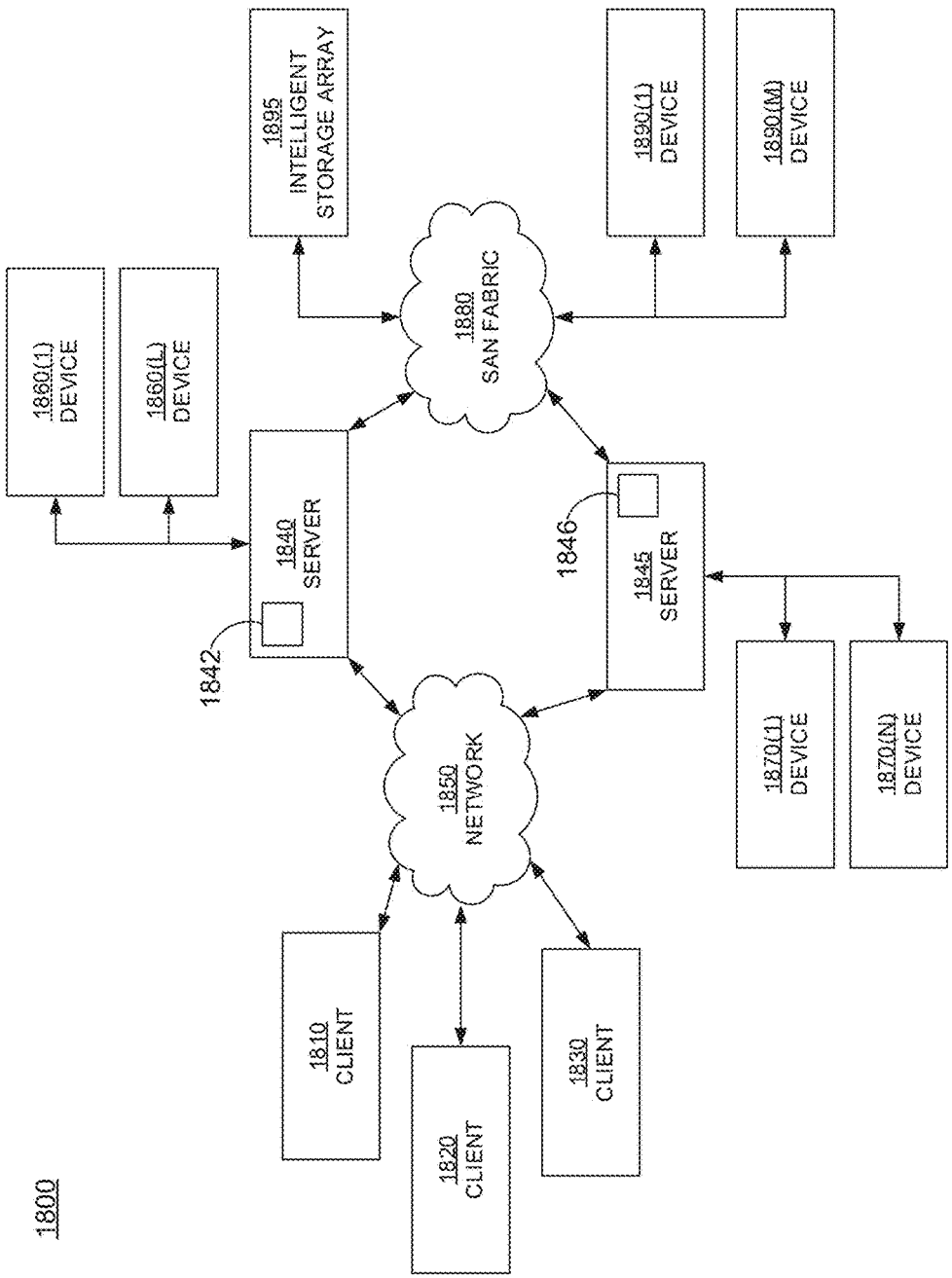
FIG. 18 is a block diagram of an exemplary operating environment, in accordance with various embodiments.

FIG. 18 is a block diagram of an example of an operating environment 1800 in which client systems 1810, 1820, and 1830 and servers 1840 and 1845 may be coupled to a network 1850. Client systems 1810, 1820, and 1830 generally represent any type or form of computing device or system, such as computing system 1700 of FIG. 17.

Similarly, servers 1840 and 1845 generally represent computing devices or systems, such as application servers or database servers, configured to provide various database services and/or run certain software applications. In some embodiments, the servers 1840 may include one or memory controllers and topologies 1842, as described herein. In some embodiments, the servers 1845 may include one or more memory controllers and memory topologies 1846, as described herein. For example, the memory controllers and topologies 1846 can be configured with dynamic termination schemes during memory accesses according the termination configurations shown in FIGS. 3A-B, 5-7, 11-12, and 14. Network 1850 generally represents any telecommunication or computer network including, for example, an intranet, a WAN, a LAN, a PAN, or the Internet.

As illustrated in FIG. 18, one or more storage devices 1860(1)-(L) may be directly attached to server 1840. Similarly, one or more storage devices 1870(1)-(N) may be directly attached to server 1845. Storage devices 1860(1)-(L) and storage devices 1870(1)-(N) generally represent any type or form of storage device or medium capable of storing data and/or other computer-readable instructions. Storage devices 1860(1)-(L) and storage devices 1870(1)-(N) may represent NAS devices configured to communicate with servers 1840 and 1845 using various protocols, such as NFS, SMB, or CIFS.

Servers 1840 and 1845 may also be connected to a SAN fabric 1880. SAN fabric 1880 generally represents any type or form of computer network or architecture capable of facilitating communication between storage devices. SAN fabric 1880 may facilitate communication between servers 1840 and 1845 and storage devices 1890(1)-(M) and/or an intelligent storage array 1895. SAN fabric 1880 may also facilitate, via network 1850 and servers 1840 and 1845, communication between client systems 1810, 1820, and 1830 and storage devices 1890(1)-(M) and/or intelligent storage array 1895 in such a manner that devices 1890(1)-(M) and array 1895 appear as locally attached devices to client systems 1810, 1820, and 1830. As with storage devices 1860(1)-(L) and storage devices 1870(1)-(N), storage devices 1890(1)-(M) and intelligent storage array 1895 generally represent any type or form of storage device or medium capable of storing data and/or other computer-readable instructions.

With reference to computing system 1700 of FIG. 17, a communication interface, such as communication interface 1722, may be used to provide connectivity between each client system 1810, 1820, and 1830 and network 1850. Client systems 1810, 1820, and 1830 may be able to access information on server 1840 or 1845 using, for example, a Web browser or other client software. Such software may allow client systems 1810, 1820, and 1830 to access data hosted by server 1840, server 1845, storage devices 1860(1)-(L), storage devices 1870(1)-(N), storage devices 1890(1)-(M), or intelligent storage array 1895. Although FIG. 18 depicts the use of a network (such as the Internet) for exchanging data, the embodiments described herein are not limited to the Internet or any particular network-based environment.

The above described embodiments may be used, in whole or in part, in systems that process large amounts of data and/or have tight latency constraints, and, in particular, with systems using one or more of the following protocols and formats: Key-Value (KV) Store, Memcached, Redis, Neo4J (Graph), Fast Block Storage, Swap Device, and Network RAMDisk. In addition, the above described embodiments may be used, in whole or in part, in systems employing virtualization, Virtual Desktop Infrastructure (VDI), distributed storage and distributed processing (e.g., Apache Hadoop), data analytics cluster computing (e.g., Apache Spark), Infrastructure as a Service (IaaS), Platform as a Service (PaaS), and other cloud computing platforms (e.g., Vmware vCloud, Open Stack, and Microsoft Azure). Further, the above described embodiments may be used, in whole or in party, in systems conducting various types of computing, including Scale Out, Disaggregation, Multi-Thread/Distributed Processing, RackScale, Data Center Scale Computing, Elastic Memory Provisioning, Memory as a Service, page migration and caching and Application Offloading/Acceleration and Integration, using various types of storage, such as Non-Volatile Memory Express, Flash, Multi-Tenancy, Internet Small Computer System Interface (iSCSI), Object Storage, Scale Out storage, and using various types of networking, such as 10/40/100 GbE, Software-Defined Networking, Silicon Photonics, Rack TOR Networks, and Low-Latency networking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A memory system comprising:
   a memory controller coupled to a data bus, wherein the data bus comprises a first subchannel and a second subchannel;
   a first plurality of memory modules of the first subchannel; and
   a second plurality of memory modules of the second subchannel, wherein, for a read operation of a first memory module of the first plurality of memory modules of the first subchannel, the memory controller is dynamically configured to apply a first on die termination (ODT) configuration to a plurality of inactive memory modules of the first subchannel, dynamically configured to apply a second ODT configuration to the second plurality of memory modules of the second subchannel, and dynamically configured to apply a third ODT configuration to the first memory module, wherein the third ODT configuration is an off configuration.

2. The memory system of claim 1, wherein the first ODT configuration of the plurality of inactive memory modules of the first subchannel comprises a respective first rank configuration and a respective second rank configuration for each of the inactive memory modules.

3. The memory system of claim 1, wherein an ODT configuration of the memory controller associated with the read operation is an off configuration.

4. The memory system of claim 1, further comprising:
   a first data buffer and a second data buffer, wherein the memory controller is further configured to control an ODT configuration of the first data buffer and to control an ODT configuration of the second data buffer.

5. The memory system of claim 4, wherein the first data buffer and the second data buffer are disposed on a same motherboard.

6. The memory system of claim 4, wherein the memory controller is further configured to control ODT configurations of a primary interface and a secondary interface of the first data buffer.

7. The memory system of claim 1, wherein the second ODT configuration comprises an off configuration for the second plurality of memory modules of the second subchannel.

8. The memory system of claim 1, wherein the first plurality of memory modules comprises four dual in-line memory modules (DIMMs) and the second plurality of memory modules comprises four DIMMs.

9. The memory system of claim 1, wherein for a write operation of a second memory module of the first plurality of memory modules of the first subchannel, the memory controller is dynamically configured to apply a third ODT configuration to inactive memory modules of the first subchannel and dynamically configured to apply a fourth ODT configuration to the plurality of memory modules of the second subchannel.

10. The memory system of claim 1, wherein the first plurality of memory modules and the second plurality of memory modules are double data rate type 4 (DDR4) DIMMs.

11. A memory system comprising:
a memory controller coupled to an address bus, wherein the address bus comprises a first subchannel and a second subchannel;
a first plurality of memory modules of the first subchannel; and
a second plurality of memory modules of the second subchannel, wherein for sending an address to a first memory module of the first plurality of memory modules of the first subchannel, the memory controller is dynamically configured to apply a first input bus termination (IBT) configuration to inactive memory modules of the first subchannel, dynamically configured to apply a second IBT configuration to the plurality of memory modules of the second subchannel, and dynamically configured to apply a third IBT configuration to the first memory module, wherein the third IBT configuration is an off configuration.

12. The memory system of claim 11, further comprising:
a first clock driver and a second clock driver, wherein the first clock driver and the second clock driver are disposed on a same motherboard.

13. The memory system of claim 12, wherein the first clock driver is a registered clock driver (RCD) and the second clock driver is an RCD.

14. The memory system of claim 12, wherein the memory controller is further dynamically configured to control IBT configurations of the first clock driver and the second clock driver.

15. The memory system of claim 11, wherein the first plurality of memory modules comprises four dual in-line memory modules (DIMMs) and the second plurality of memory modules comprises four DIMMs.

16. The memory system of claim 11, wherein for a write of a second memory module of the first plurality of memory modules of the first subchannel, the memory controller is dynamically configured to apply a third IBT configuration to inactive memory modules of the first subchannel and dynamically configured to apply a fourth IBT configuration to the plurality of memory modules of the second subchannel.

17. A method for configuring a plurality of memory modules, the method comprising:
receiving a memory request, wherein the memory request comprises an address;
responsive to the memory request, sending a plurality of address bus termination signals, wherein a first address bus termination signal is associated with a first termination configuration of a first memory module of the plurality of memory modules associated with the address of the memory request, wherein the first termination configuration comprises an open termination configuration, and wherein a second address bus termination signal is associated with a second termination configuration for a second memory module of the plurality of memory modules; and
sending the address to the first memory module associated with the address of the memory request.

18. The method of claim 17, wherein the plurality of address bus termination signals further comprises a respective input bus termination (IBT) configuration for each memory module of the plurality of memory modules.

* * * * *